US009669584B2

(12) United States Patent
McKinnon et al.

(10) Patent No.: US 9,669,584 B2
(45) Date of Patent: Jun. 6, 2017

(54) IMAGING MONITORING METHOD AND APPARATUS FOR FABRICATING THREE DIMENSIONAL MODELS

(71) Applicant: SOLIDSCAPE, INC., Merrimack, NH (US)

(72) Inventors: William McKinnon, Antrim, NH (US); Ron Sorli, Merrimack, NH (US); John T. Wigand, Merrimack, NH (US)

(73) Assignee: Solidscape, Inc., Merrimack, NH (US)

( * ) Notice: Subject to any disclaimer, the term of this patent is extended or adjusted under 35 U.S.C. 154(b) by 834 days.

(21) Appl. No.: 13/912,653

(22) Filed: Jun. 7, 2013

(65) Prior Publication Data
US 2013/0328227 A1 Dec. 12, 2013

Related U.S. Application Data

(60) Provisional application No. 61/657,273, filed on Jun. 8, 2012.

(51) Int. Cl.
B29C 67/00 (2017.01)
B33Y 40/00 (2015.01)
B33Y 30/00 (2015.01)

(52) U.S. Cl.
CPC ........... B29C 67/0088 (2013.01); B33Y 30/00 (2014.12); B33Y 40/00 (2014.12)

(58) Field of Classification Search
CPC .................................................. B29C 67/0088
See application file for complete search history.

(56) References Cited

U.S. PATENT DOCUMENTS

| | | | |
|---|---|---|---|
| 4,247,508 A | 1/1981 | Housholder | |
| 5,136,515 A | 8/1992 | Helinski | |
| 5,209,878 A | 5/1993 | Smalley et al. | |
| 5,260,009 A | 11/1993 | Penn | |
| 5,506,607 A | 4/1996 | Sanders, Jr. et al. | |
| 5,740,051 A | 4/1998 | Sanders, Jr. et al. | |
| 6,019,814 A | 2/2000 | Horine | |
| 6,175,422 B1 | 1/2001 | Penn et al. | |
| 7,003,864 B2 | 2/2006 | Dirscherl | |
| 7,700,016 B2 | 4/2010 | Wigand et al. | |
| 7,993,123 B2 | 8/2011 | Wigand et al. | |
| 2002/0129485 A1 | 9/2002 | Mok et al. | |
| 2004/0089980 A1 | 5/2004 | Owada | |
| 2004/0265413 A1* | 12/2004 | Russell | B29C 67/0059 425/375 |
| 2005/0087897 A1 | 4/2005 | Nielsen et al. | |
| 2009/0252821 A1 | 10/2009 | Wigand et al. | |
| 2010/0021638 A1 | 1/2010 | Varanka et al. | |
| 2011/0282482 A1* | 11/2011 | Knighton | B29C 67/0055 700/111 |
| 2017/0031635 A1* | 2/2017 | Pettis | G06F 3/12 |

* cited by examiner

Primary Examiner — Robert J Grun
(74) Attorney, Agent, or Firm — Davis & Bujold PLLC; Michael J. Bujold

(57) ABSTRACT

An imaging monitoring system and method for the establishment, monitoring and control of the positions, orientations and operational tolerances of and between the elements of an apparatus for fabricating three dimensional models from successive layers of model and sacrificial materials by capturing and analyzing images of a test patterns created on test surfaces of a three dimension model and elements of a system for fabricating three dimensional models.

9 Claims, 11 Drawing Sheets

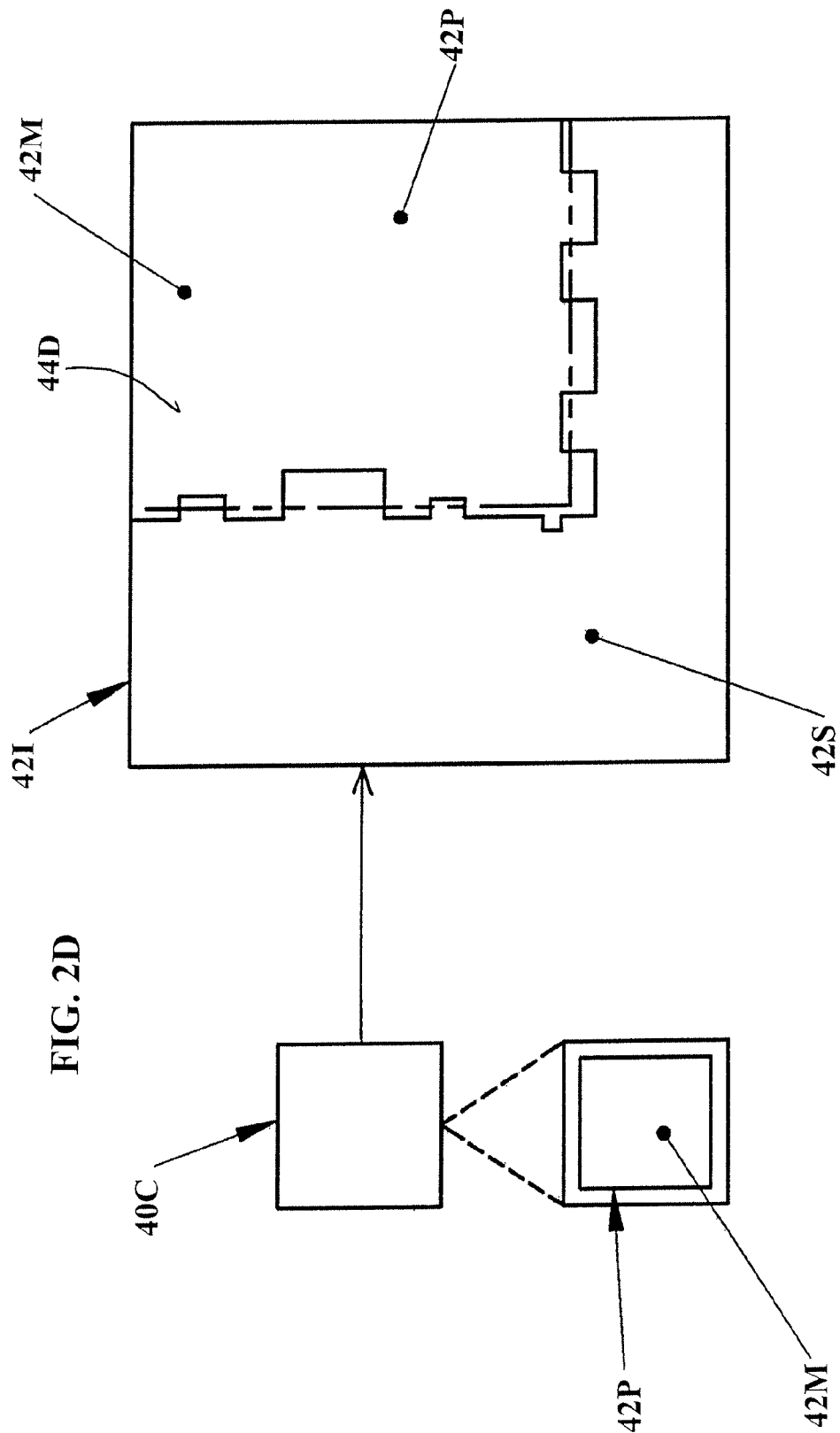

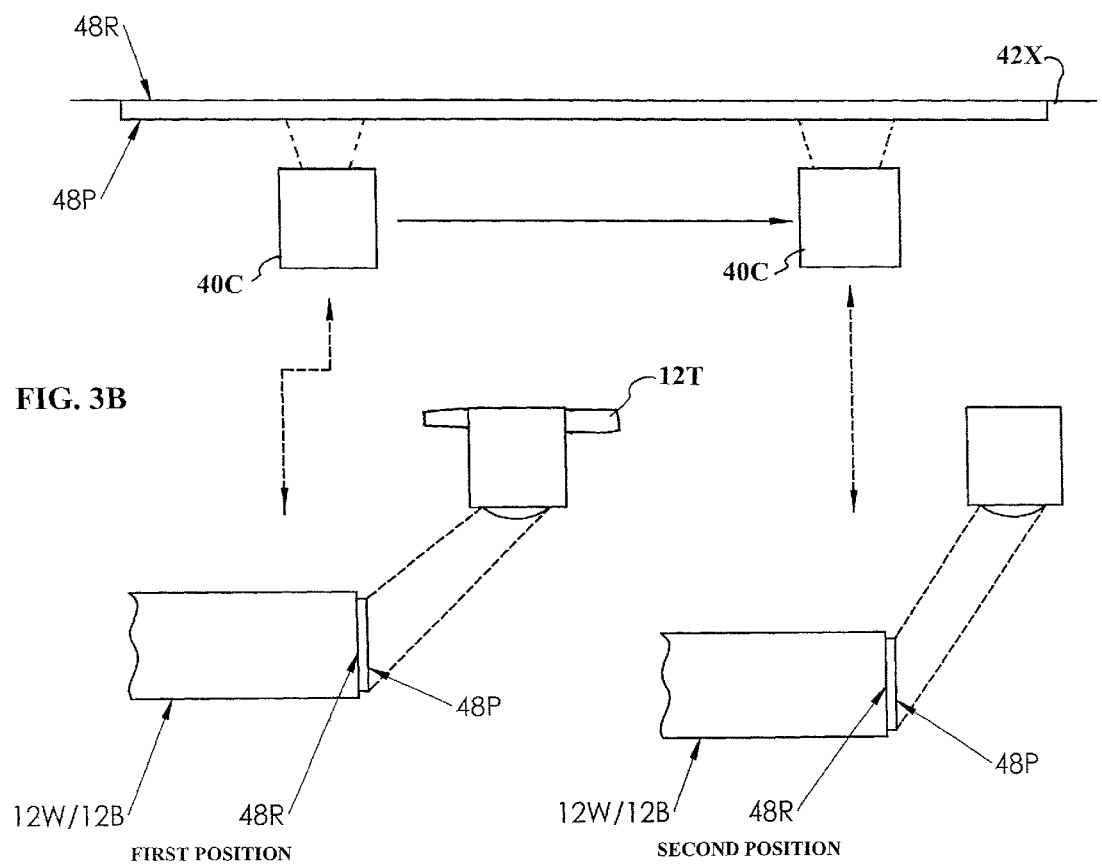

IMAGING MONITORING METHOD AND APPARATUS FOR FABRICATING THREE DIMENSIONAL MODELS

CROSS REFERENCE TO RELATED APPLICATIONS

This application is a non-provisional of U.S. Provisional Application Ser. No. 61/657,273 filed Jun. 8, 2012.

This application is related to U.S. patent application Ser. No. 13/481,281 and U.S. Pat. No. 7,700,016 issued to Wigand et al. on Apr. 20, 2010 for a Method And Apparatus For Fabricating Three Dimensional Models and U.S. Pat. No. 7,993,123 issued to Wigand et al. on Aug. 9, 2011 for a Method And Apparatus For Fabricating Three Dimensional Models, both of which are incorporated herein by reference.

FIELD OF THE INVENTION

The present invention relates to a method and apparatus for fabricating three dimensional models by fabrication of three dimensional models by the successive deposition of at least layers of a model material comprising the model and layers of sacrificial material comprising a supportive shell around the model and, more specifically, to methods and apparatus for the establishment, monitoring and control of the positions, orientations and position and orientation tolerances of and between the elements of the apparatus for fabricating three dimensional models, including establishing, monitoring and controlling the thicknesses, rates of deposition and edge orientations and tolerances of the deposited materials.

BACKGROUND OF THE INVENTION

Various methods and systems for construction of three dimensional models or objects have been developed for a number of applications, including the rapid fabrication of prototypes and the low volume fabrication of models and objects of varying degrees of complexity.

The need for rapid, low cost, low volume fabrication of models and parts has generally been met by various three dimensional (3D) modeling processes that employ layer by layer building processes. According to typical prior art three dimensional modeling processes, a model or a part is built up by the successive deposition of layers generally comprising a "model" material forming the final part to be manufactured and a sacrificial material that provides support for the model material during the building or fabrication process. Following completion of the fabrication or building process, the sacrificial material is subsequently removed thereby leaving the model material which forms the final part to be manufactured.

Typical examples of three dimensional modeling processes of the prior art include, for example, Householder, U.S. Pat. No. 4,247,508, which describes a modeling process that employs two substances, one a fill material and the other a mold material, that are deposited layer by layer to build an article. The two materials in each layer are not in contact with each other while the layer is being formed because Householder '508 uses a grid to separate the two materials as they are being deposited. After the materials in each layer are deposited, the grid is moved to the next layer so that the two materials may fill the space left by the removed grid and thereafter solidify in contact with each other in the same layer.

Helinski, U.S. Pat. No. 5,136,515, describes a method wherein a three dimensional model is produced layer by layer by jetting droplets of at least two solidifiable materials, one material forming the article and a second material forming a support for the article. The second material is subsequently removed by heating, cutting, melting, chemical reacting, and so on, to leave the desired article.

Penn, U.S. Pat. No. 5,260,009, describes a system and process for making three dimensional objects by dispensing layer upon layer of modeling material using an inkjet which is turned "on" or "off" according to a two dimensional data map of each layer of the object. The two dimensional data map is stored and relayed by a microprocessor and defines locations on a matrix at which printing is to occur in a manner such as is used in printing images using raster scan printing.

Sanders, Jr. et al., U.S. Pat. No. 5,506,607, describes a system for building three dimensional models by vector plotting layer-upon-layer applications of solidifiable substances. The layers are formed by expelling minuscule beads of the substances in a liquid or flowable phase onto a platform from one or more jets wherein the jets and platform are relatively movable in the X, Y and Z coordinate system and the beads are deposited along vectors during X-Y relative movement.

Sanders, Jr. et al., U.S. Pat. No. 5,740,051, describes a method and apparatus for producing a three dimensional model by forming a continuous plurality of parallel layers of modeling material by repeatedly producing a plurality of bead producing drops of the modeling material for deposition at desired locations, controlling the locations and timing of deposition to produce vectors in any and all directions required to produce an outer surface defining a wall of a layer with a desired surface finish, and adjusting the distance of the location of drop production to the location of drop deposition in preparation for the formation of a subsequent layer.

Penn et al., U.S. Pat. No. 6,175,422, describes a method and process for computer-controlled manufacture of three dimensional objects by dispensing a layer of a first insoluble material, such as a liquid, onto a platform at predetermined locations corresponding to a cross-section of the object, which then hardens. A second material, preferably water soluble, is then sprayed onto this layer to thereby encapsulate the hardened insoluble material. The uppermost surface of this encapsulant is planed, thus removing a portion of the encapsulant to expose the underlying insoluble material for a new pattern deposition. After the resulting planing residue is removed, another layer of liquid, insoluble material is dispensed onto the planed surface. The insoluble material can be of any color and may vary from layer to layer, and from location within a layer to location with a layer. These steps are repeated, until the desired three dimensional object, encapsulted in the soluble material, is completed. At this point, the object is either heated or immersed in solvent, thereby dissolving the soluble material and leaving the three dimensional object intact.

Other systems and methods of the prior are described, for example, in U.S. Patent Publication No. 2009/0252821 which relates to a method of fabricating a model by deposition of a model material and a sacrificial material in layers wherein the sacrificial material which defines the bounds of the model is deposited, drop by drop, and the model material is deposited at high speed by spraying, while U.S. Patent Publication No. 2010/0021638 additionally describes the use of a third material to construct the layers and U.S. Pat.

No. 6,019,814 relates to the use of a nozzleless, ultrasonic device for the sequential deposition of the materials.

U.S. Patent Publication No. 2005/087897 relates to a variation of the basic method for constructing a model by deposition of successive layers of a model material comprising the model and shell material enclosing the model material wherein certain layers may be deposited as partial layers to reduce the volume of material to removed when each layer is planed and to permit the construction of more complex geometries in the layers.

U.S. Pat. No. 5,209,878 relates to the use of either thin partial layers of material or a material capable forming a meniscus in the edge regions between successive layers of different dimensions to reduce or eliminate "stairstep" voids created at the edges of layers having different dimensions.

U.S. Patent Publication No. 2002/0129485 describes a system which is an agglomeration of previously known systems for fabricating three dimensional objects which thereby provides a very flexible but complex system capable of achieving features of a wide variety of methods.

Other prior art systems employ methods somewhat analogous to those used to construct three dimensional objects as successive layers of different materials, but as adapted specifically and essentially to object molding processes. For example, U.S. Patent Publication No. 2004/0089980 describes a method for fabricating three dimensional models by deposition and machining of three or four successive thick layers, thereby concurrently forming a mold for the object and the object itself. The layers include including a first additive (non-sacrificial) layer which is machined to define the bottom contour of a next layer, which is a second additive (non-sacrificial) layer. The second additive (non-sacrificial) layer is deposited on the first subtractive (sacrificial) layer and machined to define the upper contour of the second additive (non-sacrificial) layer, which is the top of the finished model, with a second subtractive (sacrificial) layer being deposited and machined, if desired. The subtractive (sacrificial) material is removed when all layers are completed, thereby leaving a model formed of the additive (non-sacrificial) material.

U.S. Pat. No. 7,003,864 describes a method that is generally similar to that described in U.S. Patent Publication No. 2004/0089980 in depositing and machining three layers which concurrently form a mold for an object and the object itself, including depositing and planing a base layer of support material, depositing and removing regions of a second layer to form a mold of the part, adding a construction material to the removed regions of the second layer, and planing or machining the support and construction materials of the second layer.

The methods and systems of the prior art, for fabricating three dimensional models and objects, however, each have a significant number of fundamental problems.

For example, certain systems, such as those described in U.S. Patent Publication No. 2002/0129485, U.S. Patent Publication No. 2004/0089980, U.S. Pat. No. 7,003,864, fabricate objects or molds by machining the objects or molds from relatively thick layers of material. Such systems, however, require the removal of significant amounts of material by machining processes and tools that are capable of the desired precision and often require a variety of machining tools heads in order to obtain the desired contours in the objects or molds, so that such systems and are typically slow and wasteful and requiring complex, expensive machining components or elements.

Other of the systems and methods of the prior art, such as those described in U.S. Pat. No. 4,247,508, U.S. Pat. No. 5,136,515, U.S. Pat. No. 5,260,009, U.S. Pat. No. 5,506,607, U.S. Pat. No. 5,740,051, U.S. Pat. No. 6,175,422, U.S. Patent Publication No. 2009/0252821, U.S. Patent Publication No. 2005087897, U.S. Pat. No. 5,209,878, and U.S. Patent Publication No. 2002/0129485, fabricate objects by the deposition and selective removal of thin layers of two or more materials, thus allowing the fabrication of more complex objects by relatively less complex or expensive systems. Such systems, however, require that at least one material be deposited on the layers, during the building process, by a drop-by-drop deposition process in order to define the surfaces of the object with the desired precision but this results in a relatively slow building processes, thus increasing the time and cost to fabricate each object and reducing and either reducing the rate of production of objects or requiring the addition of further fabrication machines to achieve a given production rate.

Still other significant and persistent problems of the systems and method of the prior art include the establishment, monitoring and control of the positions, orientations and position and orientation tolerances of and between the elements of the apparatus for fabricating three dimensional models, including the thicknesses, rates of deposition and edge orientations and tolerances of the deposited materials.

The present invention provides a solution to these and related problems of the prior art.

SUMMARY OF THE INVENTION

The present invention is directed to an imaging monitoring system and method for the establishment, monitoring and control of the positions, orientations and operational tolerances of and between the elements of an apparatus for fabricating three dimensional models from successive layers of model and sacrificial materials.

According to the present invention, a system for fabricating three dimensional models by successive deposition of at least one material includes at least one of at least one model material to form the model and at least one subsequently removed sacrificial material for supporting the model material during fabrication of the model, a workpiece platform for supporting the composite model during fabrication and a tool platform for supporting a camera and at least one material deposition device for depositing the at least one material on layers of the model, with the at least one material deposition device and the camera having a known orientation and planar relationship with a tool platform reference plane and the workpiece platform and the tool platform being positional with respect to each other along an X axis, a Y axis and a Z axis.

A first aspect of the present invention includes depositing at least one test pattern comprising the at least one material on at least one imaging surface related to one of a present and an existing layer of the composite model, the workpiece platform, a test surface and a currently topmost layer of the model and capturing an image of the at least one test pattern, examining the image of the at least one test pattern to determine at least one characteristic of the test pattern representing operation of the fabrication system.

A further aspect of the present invention includes depositing the at least one test pattern on the at least one imaging surface, and wherein the step of examining the image of the at least one test pattern to determine at least one characteristic of the test pattern includes determining a distribution in the image of the material and a surface of the imaging surface along at least an edge of the at least one test pattern and determining, from the distribution of the material and the surface of the imaging surface, a characteristic of the test pattern wherein the characteristic of the test pattern includes at least one of a location of the test pattern on the imaging surface, a geometric shape of the test pattern, a degree of coverage of the imaging surface by the material.

Yet a further aspect of the present invention includes capturing an image of the at least one test pattern and examining the image of the at least one test pattern to determine at least one characteristic of the test pattern by illuminating the imaging surface with a illumination source having an axis of emission that is oblique to the imaging axis of the camera and to the imaging surface, at a known angle of illumination, capturing the image of the at least one test pattern and an adjacent area of the imaging surface, including a shadow cast on the imaging surface by the material of the test pattern as illuminated by the illumination source, determining a width of the shadow cast on the imaging surface, and determining a thickness of the material of the test pattern from width of the shadow cast on the imaging surface and the known angle of illumination.

A still further aspect of the present invention includes examining the image of the at least one test pattern to determine at least one characteristic of the test pattern by fixing the focal length of the camera at a fixed distance from the camera, adjusting a distance between the test pattern on the imaging surface and the camera until an optimum focus of the test pattern is detected, determining an offset between the camera and the imaging surface to be the focal length of the camera, and determining an offset between the tool platform reference plane and the imaging surface, according to a known relationship to the offset between the camera and the imaging surface.

According to a further aspect of the present invention, the imaging surface comprises a first parallax reference plane perpendicular to the workpiece platform and having thereon a parallax reference pattern of known vertical dimension and the camera is positioned along and offset horizontally from the parallax reference plane so that an image capture angle, of the camera, includes the parallax reference pattern. The present invention includes capturing a first image of the parallax reference pattern, at a first position along the first parallax reference plane, and determining from the apparent width in the image of the parallax reference pattern in the first image and the known distance and angle between an image axis of the camera and the parallax reference pattern, a first distance between the camera and the parallax reference pattern, and thereby a first distance between the parallax reference pattern and the tool platform reference plane. The camera then traverses to a second position, along the first parallax reference plane, and captures a second image of the parallax reference pattern at the second position along the first parallax reference plane, and determines, from the apparent width in the image of the parallax reference pattern in the second image and a known distance and known angle between an image axis of the camera and the parallax reference pattern, a second distance between the camera and the parallax reference pattern, and thereby a second distance between the parallax reference pattern and the tool platform reference plane. The present invention then compares the first distance, between the parallax reference pattern and the tool platform reference plane, and the second distance, between the parallax reference pattern and the tool platform reference plane, to determine at least one of a distance between the workpiece platform and the tool platform reference plane and the parallelism between the workpiece platform and the fool platform reference plane along at least the parallax reference plane.

According to the present invention, the method of determining either, or both, of a distance between the workpiece platform and the tool platform reference plane and the parallelism between the workpiece platform and the fool platform reference plane, along at least the parallax reference plane, may include repeating the steps of parallax offset determination for a second parallax reference plane orthogonal to the first parallax reference plane.

In a further aspect of the present invention, the method and apparatus may deposit the at least one test pattern on the imaging surface and then increment the imaging surface toward the tool platform reference plane so that a cutting edge of one of a milling tool and a planing tool, at a known displacement from the tool platform reference plane, intersects the at least one test pattern along a milling plane parallel with the tool platform reference plane and at a height between an upper surface of the at least one test pattern and the imaging surface. An area of the at least one test pattern is then planed and an image of the at least one test pattern is captured and analyzed to determine an offset between the image plane and the tool platform reference plane and a parallelism of the image plane with the tool platform reference plane.

In further aspects of the present invention, the test surface comprises a surface of a test tape stored on a test tape supply spool and advanced by a test tape take-up mechanism into and through a test region where test patterns may be created on the surface of the test tape and the camera may be utilized to capture an image of the test tape, stored on the test tape supply spool, to determine the remaining supply of test tape for the imaging monitoring system. The camera may be similarly employed to capture an image of the test tape advanced through the take-up mechanism to confirm operation of the take-up mechanism.

In a present embodiment of the present invention, the test tape is supported horizontally in the test region by a tension maintained on the test tape by the test tape supply spool and the take-up mechanism.

BRIEF DESCRIPTION OF THE DRAWINGS

The invention will now be described, by way of example, with reference to the accompanying drawings in which:

FIGS. 2C, 2D and 2E are sectional views of the examination of a test pattern by camera with vertical and oblique illumination sources;

FIG. 3B is a diagrammatic representation of a parallax method for determining the vertical offset between the upper surface of workpiece base or workpiece platform and a tool plane.

DETAILED DESCRIPTION OF THE INVENTION

Figure 1A:
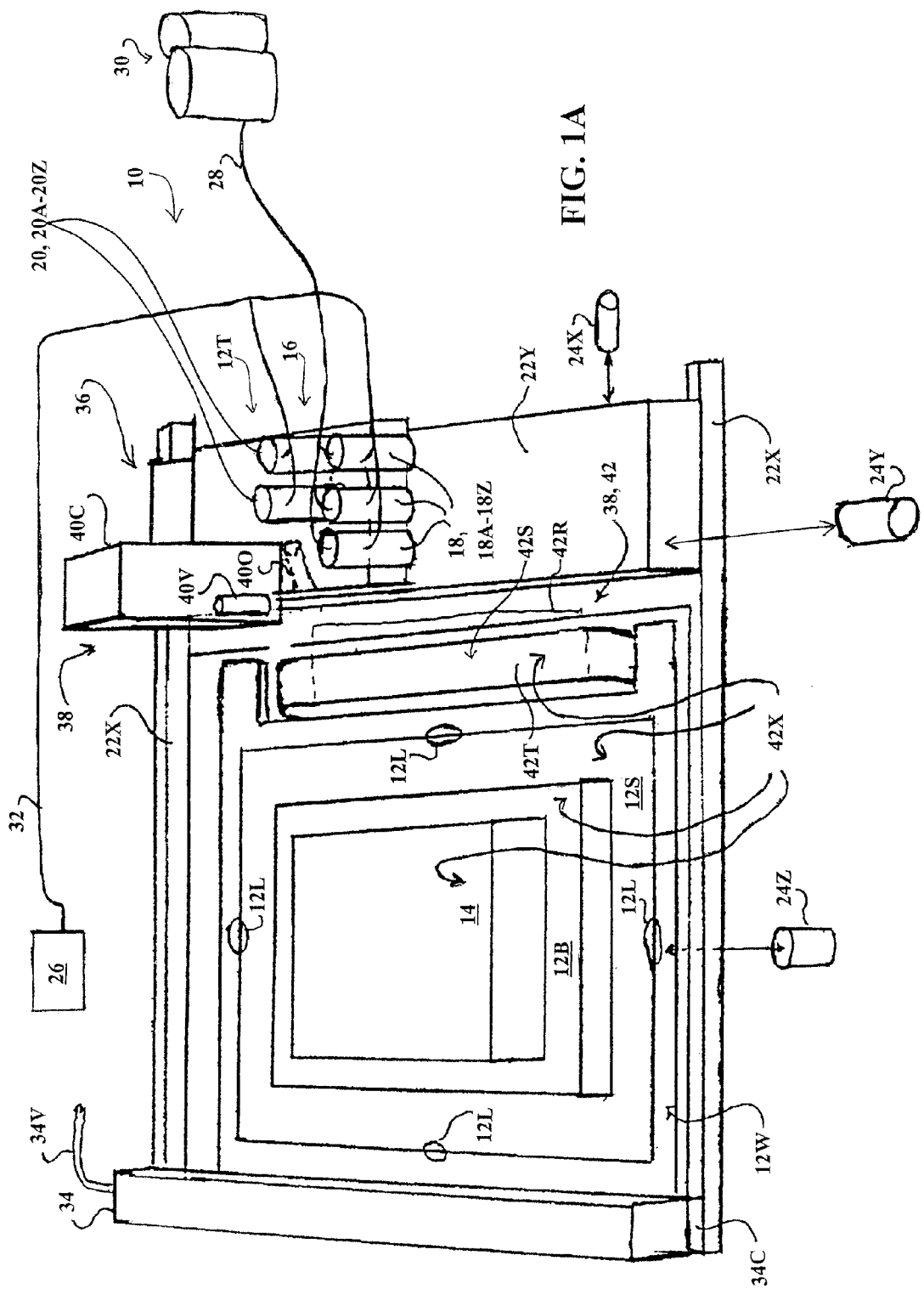
FIG. 1A is a diagrammatic isometric view of a fabrication system.

As described herein above, the present invention is directed to methods and mechanisms for the establishment, monitoring and control of the positions, orientations and positional and orientational tolerances of and between the elements of an apparatus for fabricating three dimensional models from successive layers of model and sacrificial materials, including establishing, monitoring and controlling the thicknesses, the rates of deposition and the edge orientations and the tolerances of the deposited materials.

The following will first describe exemplary processes of fabricating a three dimensional model by the successive deposition of layers of the model and the sacrificial materials to illustrate the functions required of an apparatus for fabricating such models, and will then briefly describe the elements of such an apparatus.

The following will then describe the mechanisms and methods of the present invention for the establishment, monitoring and control of the positions, orientations and position and orientation tolerances of and between the elements of the apparatus, including establishing, monitoring and controlling the thicknesses, rates of deposition and edge orientations and tolerances of the deposited materials.

A. Methods for Fabrication of Three Dimensional Models

Examples of the basic processes and steps for fabricating a three dimensional model from successive layers of model and sacrificial materials are described in, for example, U.S. Pat. No. 7,700,016 issued to Wigand et al. on Apr. 20, 2010 for a Method And Apparatus For Fabricating Three Dimensional Models and U.S. Pat. No. 7,993,123 issued to Wigand et al. on Aug. 9, 2011, also titled Method And Apparatus For Fabricating Three Dimensional Models, both of which are incorporated herein by reference.

As described therein, a three dimensional model is fabricated by the construction of a composite model formed by the deposition of successive layers comprised of a model material and a sacrificial mold material. The deposition of each layer of the composite model typically comprises the steps of depositing a line or lines of the sacrificial material, delineating a boundary or boundaries of the model material within the layer, via a drop-by-drop deposition of the sacrificial mold material, wherein the sacrificial mold material boundary or boundaries will typically enclose each area of the layer to be filled with the model material, and thereafter depositing the model material onto all regions of the layer by a high deposition rate process, such as spray deposition. The deposition of a single layer of the model will typically further include the step of removing a small portion of the deposited layer of the sacrificial mold material and the model material to reduce the layer to a selected thickness and to establish the plane of the upper surface of the layer and to expose the upper surfaces of the sacrificial mold material and model material in preparation for the deposition of the next successive layer.

After all of the successive layers of the model are deposited, the process is concluded by the removal of the sacrificial mold material, from the composite model, by a process effecting only the sacrificial mold material, such as heat or a solvent, and thereby leaving the final model formed of the model material.

Further and improved methods and processes for the fabrication of three dimensional models, by the successive deposition of layers of model and sacrificial materials, are described in U.S. Provisional Application Ser. No. 61/490,247 filed May 26, 2011 and the corresponding co-pending U.S. patent application Ser. No. 13/481,281. As described therein, a layer of the composite model may be formed from the model material, the sacrificial material or a combination of both the model and the sacrificial materials. In the instance of a layer comprising both the model material and the sacrificial material, the layer of the composite model currently being deposited is initially formed by the deposition of a layer of the model material extending over an area greater than the maximum length and width dimensions of any subsequent layer of the composite model. One or more selected areas of the model material, typically in the form of a "channel(s)", a "trough(s)", a "trench(s)" or a "groove(s)" are then removed from the model material layer by a machining or milling process to a depth typically extending normally from the top of the current layer of the model material to the top of the immediately adjacent preceding layer. The area or areas, from where the model material is removed, by the removal process, are then subsequently filled with the sacrificial material so as to completely fill and enclose the removed area or areas with the sacrificial material, and finally the current layer is then planed to the desired surface thickness and the surface adequately cleaned, e.g., vacuumed or blown, for example, to remove any generated dust, debris and particulate matter and thereby complete formation that current layer. Following planing and cleaning of the currently layer, the partially completed composite model is thereby prepared for fabrication of the next subsequent layer of the composite model and this process is repeated until fabrication of the entire three dimensional composite model is eventually completed.

These steps are then repeated, layer by layer, numerous times with each layer being formed of the model material, the sacrificial material or both materials, as required depending upon the specific details or features of the composite model in each layer being fabricated.

B. Apparatus for Fabrication of Three Dimensional Models

An apparatus for performing certain of the basic processes for fabricating composite three dimensional models are illustrated in, for example, U.S. Pat. No. 7,700,016 issued to Wigand et al. on Apr. 20, 2010 for a Method And Apparatus For Fabricating Three Dimensional Models and U.S. Pat. No. 7,993,123 issued to Wigand et al. on Aug. 9, 2011, also titled Method And Apparatus For Fabricating Three Dimensional Models, both of which are incorporated herein by reference. The following will describe an improved version of the apparatus described in U.S. Pat. No. 7,700,016 and U.S. Pat. No. 7,993,123, wherein the improved apparatus includes the capability of performing, in particular, the processes described in U.S. Provisional Application Ser. No. 61/490,247 filed May 26, 2011 and corresponding co-pending U.S. patent application Ser. No. 13/481,281 and described herein above. The improved apparatus described herein below will also include methods and mechanisms of the present invention for the establishment, monitoring and control of the positions, orientations and positional and orientational tolerances of and between the elements of an apparatus for fabricating three dimensional models from successive layers of model and sacrificial materials, including establishing, monitoring and controlling the thicknesses, the rates of deposition and the edge orientations and the tolerances of the deposited materials.

Figure 1B:
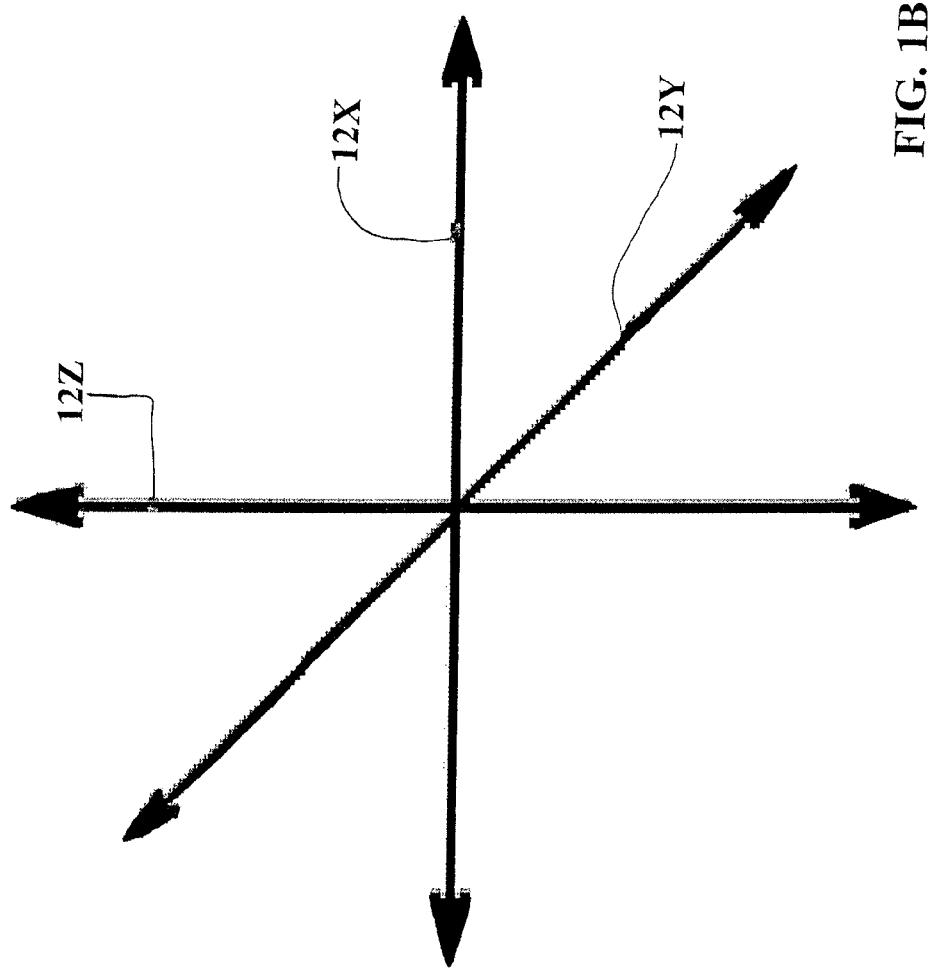
FIGS. 1B and 1C are diagrammatic representations of the axis and planes of orientation of a tool platform and a workpiece platform of a fabrication system.
Figure 1C:
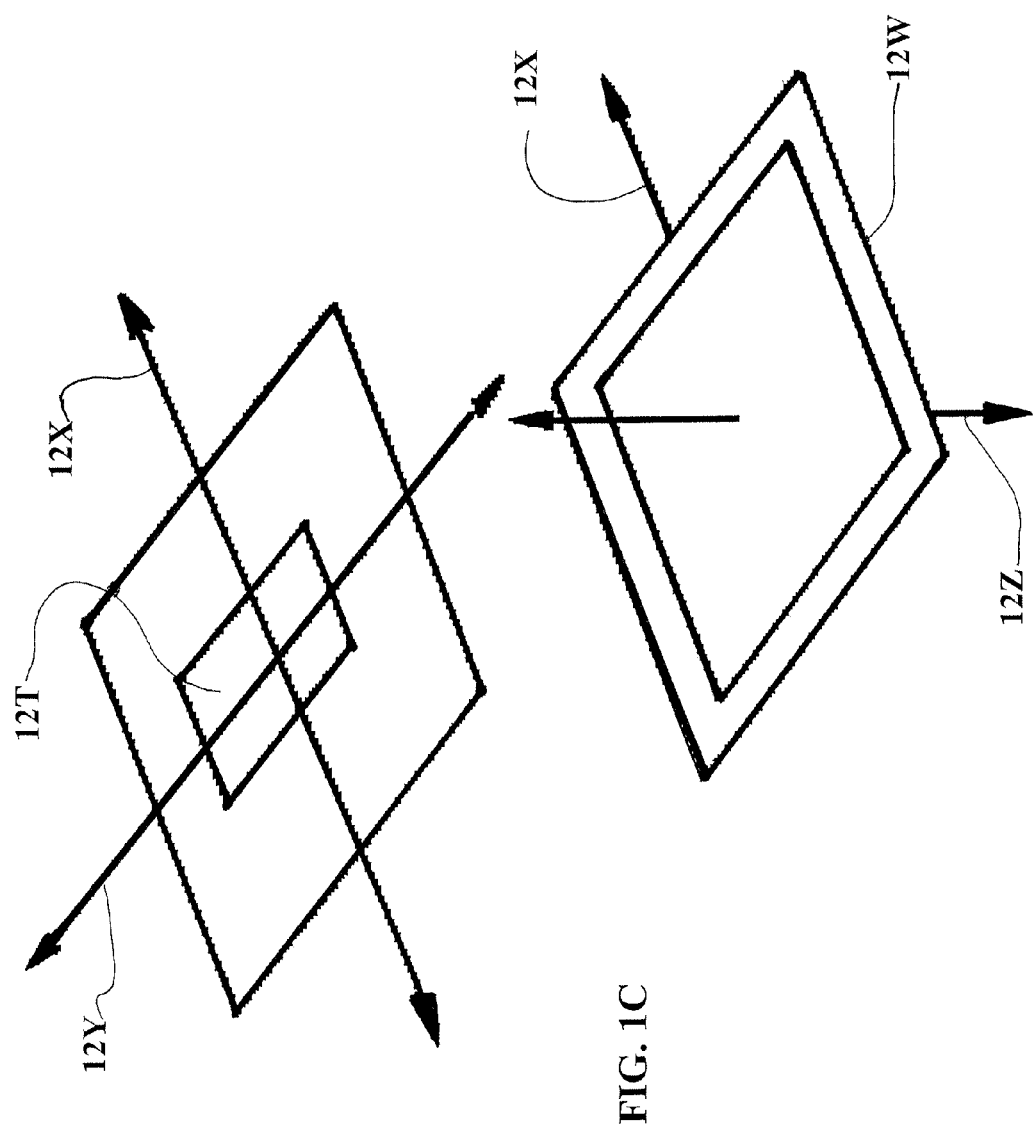

Referring now to FIGS. 1A-1C, therein is shown an isometric and diagrammatic view of a three dimensional model fabrication system 10 incorporating the present invention.

As shown therein, a fabrication system 10 includes a vertically positional workpiece platform 12W for supporting a composite model 14 being fabricated and a tool platform 12T that is supported above workpiece platform 12 and supports a plurality of associated fabrication tools 16, such as material deposition devices 18, such as material deposition devices 18A, 18B . . . 18Z and one or more milling tools 20, such as milling tools 20A, 20B . . . 20Z. It must be recognized and understood with regard to the following description of the present invention that the number and locations of the material deposition devices 18 and the milling tools 20, on or in the a tool platform 12T, may vary, for any given embodiment of the present invention, significantly from that shown in FIG. 1A and the other Figures while still falling within the scope of the present invention.

The workpiece platform 12W is vertically positional along a vertical Z axis 12Z with respect to a generally horizontal tool platform reference plane 12XY while the tool platform 12T is supported vertically above the workpiece platform 12W on the tool platform reference plane 12XY. In a presently preferred embodiment, the tool platform 12T is supported on and is positional along a Y axis rail 22Y that extends along a horizontal Y axis 12Y in the tool platform reference plane 12XY. The opposing ends of the Y axis rail 18Y are, in turn, supported upon and are positional along a pair of corresponding generally horizontal X axis rails 22X that are located on opposite sides of the workpiece platform 12W and that extend parallel to the horizontal X axis 12X in the tool platform reference plane 12XY that is orthogonal to the Y axis 12Y in the tool platform reference plane 12XY.

The tool platform 12T, with the associated fabrication tools 16, is thereby positional anywhere in the tool platform reference plane 12XY, which is typically parallel to the composite model 14 and, in particular, the currently topmost layer of the composite model 14 which is, in turn, vertically positional along the Z axis 12Z with respect to the tool platform reference plane 12XY. It should be noted, however, that while the layers of the composite model 14 are parallel to the tool platform reference plane 12XY, as a consequence of each successive layer being deposited and shaped by the fabrication tools 16 mounted on the tool platform 12T and thereby restrained to the tool platform reference plane 12XY, the plane of the workpiece platform 12W is not necessarily parallel with the tool platform reference plane 12XY. As will be discussed below, and while the orientation of the plane of the workpiece platform 12W is controllable with respect to the tool plane 12T, there may be circumstances in which it is desirable or advantageous to angularly offset the orientation of the plane of the workpiece platform 12W with respect to the tool platform 12W.

According to one embodiment of the fabrication system 10, and as illustrated in FIGS. 1A-1C, the workpiece platform 12W may be designed and adapted to receive and secure a workpiece support plate 12S, which may comprise, for example, a metal plate engaging with an opening or recess in or on the workpiece platform 12W and retained therein by the workpiece support platform latches 12L, e.g., four separate latches, with the upper surface of the workpiece support plate 12S being positioned generally parallel to and offset from the tool platform reference plane 12XY. A replaceable workpiece base 12B comprises, for example, a relatively dense and typically non-porous or closed cell foam or plastic material having a relative smooth typically non-absorbent upper surface may, in turn, be removably mounted upon the workpiece support plate 12S, with the composite model 14 being fabricated on the exposed upwardly facing surface of the workpiece base 12B.

It will be seen, therefore, that the workpiece base 12B and the workpiece support plate 12S perform a number of functions, such as providing a means or mechanism for handling a finished composite model 14 without damage to the composite model 14, such as when removing the composite model 14 from the fabrication system 10 for subsequent processing, e.g., removal of the sacrificial material and/or the extraneous model material. In addition, the workpiece base 12B provides an offset between the tool platform 12T, the fabrication tools 16 and a planing device 34, described below in further detail, and the workpiece platform 12W, thereby prevents inadvertent interaction and wear or damage between, for example, the fabrication tools 16 or the planing device 34 and the workpiece platform 12W. The material of a workpiece base 12B may also provide a preferred surface for mounting and removal of the composite model 14, and may provide a surface that can be readily planed, such as by a planing device 34 described below, to be parallel with the tool platform reference plane 12XY. The workpiece base 12B also provides a readily available and possibly disposable mechanism for protecting the workpiece platform 12W and the workpiece support plate 12S from wear and contamination from the accumulation of, for example, the sacrificial and the model material generated during the fabrication processes.

As indicated in FIGS. 1A-1C, the vertical position of the workpiece platform 12T, with respect to the tool platform reference plane 12XY and thereby with respect to the fabrication tools 16, is adjustable and controlled by a Z axis actuator 24Z while the horizontal position of the tool platform 12T, along the Y axis 12Y and the X axis 12X of the tool platform reference plane 12XY, are respectively controlled by a Y axis actuator 24Y and an X axis actuator 24X. It will also be appreciated that there are a variety of designs for the Z axis, the Y axis and the X axis actuators capable of meeting these requirements, such as rotationally driven screw shafts with or without carriage guidance tracks, rack and pinion mechanisms, belts and pulleys, and so on, all of which are known to those of ordinary skill in the art and may be employed in place of the exemplary designs described herein. As such, the Z axis actors 24Z, the Y axis actuators 24Y and the X axis actuators 24X need not be described in any further detail and are accordingly represented in FIGS. 1A-1C and in the other Figures in illustrative form rather than by detailed exemplary examples of the actuators.

Referring therefore to the requirements and functions of the Z axis actuators 24Z, the Y axis actuators 24Y and the X axis actuators 24X, it will be recognized that the Z axis actuator 24Z is required to both support and move workpiece platform 12W along the Z axis 12Z with a high degree of precision and repeatability and to maintain the orientation of the plane of the workpiece platform 12W with respect to the tool plane XY at all positions along the Z axis 12Z and under varying loads placed on the workpiece platform 12W, some of which may be off center with respect to workpiece platform 12W. Because of these requirements, and for example, the Z axis actuator 24Z may comprise a rotationally driven vertically oriented screw shaft coupled to, for example, a bottom edge region of the workpiece platform 12W with the workpiece platform 12W being restrained in the horizontal orientation by multi-point roller bearings mounted onto the workpiece platform 12W and engaging with corresponding vertically oriented bearing tracks located along opposing sides of the workpiece platform 12W.

It will also be recognized that the requirements of and thus the designs for the Y axis actuator 24Y and the X axis actuator 24X may be different from those of the Z axis actuator 24Z because, for example, the tool platform 12T is supported by horizontally oriented Y axis rail 22Y and the Y axis rail 22Y is, in turn, supported by horizontally oriented X axis rails 22X while the workpiece platform 12W is supported during vertical movement and positioning. As such, the Y axis actuator 24Y and the X axis actuator 24X may comprise, for example, rotationally driven horizontally oriented screw shafts or rack and pinion mechanisms, belts and pulleys, etc., and may include or incorporate any of a variety of position sensors and indicators, a wide variety of which will be well known to those of ordinary skill in the relevant arts.

It must also be recognized that in other embodiments of the fabrication system 10, the workpiece platform 12W may be horizontally and vertically fixed and the tool platform 12T may be vertically and well as horizontally positional. The modifications to the tool platform 12T to provide vertical as well as horizontal positioning of the tool platform 12T will, however, be well understood by those of ordinary skill in the relevant arts and may comprise, for example, supporting the X axis rails 22X on a vertically positional support, possibly similar to that used for the workpiece platform 12W in the embodiment described herein above.

Referring again to the tool platform 12T, it will be noted that the tool platform 12T is illustrated in FIGS. 1A-1C as supporting two material deposition devices 18, indicated as material deposition devices 18A and 18B, which, in a typical embodiment will comprise a drop-by-drop material deposition device 18A and A high deposition rate device 18B, such as a spray device. It is to be understood, however, that the tool platform 16P may include possibly less or more than two material deposition devices 18, such as in the case of a fabrication system 10 which has the capability of a fabricating reentrant surface angles without fillets. In this case, the tool platform 12T would include the material deposition devices 18A and 18B described above, but would further include one or more additional material deposition devices 18C, 18D, . . . , etc., for depositing a second sacrificial material to form reentrant angles and further sacrificial or model materials, as required or necessary. It must also be understood that not only may the number of the material deposition devices 18 vary between embodiments of the fabrication systems 10 and the tool platforms 12T, but also the combinations of the material deposition devices 18 may vary depending upon the requirements of the composite models 14 to be fabricated.

In a fabrication system 10 having the capability of, for example, performing the "trench and fill" method for delineating model surfaces, the tool platform 12T will further include and support at least one milling tool 20, as described herein above, but may include two or more different milling tools 20A, 20B . . . 20Z to allow, for example, both fast, rough-out milling and finer precision milling or to otherwise accommodate a variety of different types and sizes milling tools. In addition, the milling tools 20 may be constructed as individual milling tools or as one or more milling tools, each of which may have two or more milling heads. In either case, the milling tool 20 or the milling head of a single milling tool 20 having a plurality of milling heads may be selected and engaged with a motor and/or engaged with the current layer of the composite model 14 by, for example, an axial solenoid actuator. As in the case of material deposition devices 18, the number, the type, the combinations thereof and the locations of the milling tools 20, on the tool platform 12T, may vary between embodiments of the fabrication systems 10 and the tool platforms 12T, and that the types and the combinations of the milling tools 20 may vary depending upon the requirements of the composite model 14 to be fabricated.

As described above, the fabrication tools 16, may including at least two material deposition devices 18 and at least one milling tool 20 together with other elements of the tool platform 12T described below, all mounted on tool platform 12T so that they are thereby jointly positional along the X axis 12X, the Y axis 12Y and the Z axis 12Z with respect to the workpiece platform 12W and the layers of the composite model 14 thereupon by means of a group of actuators comprising the X axis actuator 24X, the Y axis actuator 24Y and the Z axis actuator 24Z. It will also be apparent that, for each position taken by the tool platform 12T along the X axis 12X, the Y axis 12Y and the Z axis 12Z, each of the fabrication tools 16 mounted on the tool platform 12T will have a different "target point", that is and for example, the point at which the corresponding material from one of material deposition devices 18 is deposited on the current topmost layer of the composite model 14 being fabricated or at which the tool head of the corresponding milling tool engages with the current topmost layer of the composite model 14. According to the present invention, the offsets along the X axis 12X, the Y axis 12Y and the Z axis 12Z, between the position of the tool platform 12T, or a selected reference point thereupon, and the current "target points" of each one of the fabrication tools 16, or other elements mounted thereupon, is accommodated and compensated for by the programming within a system controller 26 which controls all operations of the fabrication system 10, including the positioning of the workpiece platform 12W and the tool platform 12T and operations of the fabrication tools 16 as well as other elements of the fabrication system 10, described herein.

Lastly with regard to the tool platform 12T, and as shown in FIGS. 1A-1C, each material deposition device(s) 18 requires a material feed connection 28 to a corresponding material supply reservoir 30 wherein the material feed connection 28 is typically heated to insure flow of the material provided therethrough to the respective material deposition device 18, and control and power connections 32 between the system controller 26 and the material deposition device 18 to communicate appropriate control and power signals between the system controller 26 and the material deposition device 18. Each milling tool 20 will similarly require a control and power connection 32 with the system controller 26 to communicate appropriate power and control signals between system controller 26 and the respective milling tool 20. Such connections and their functions are, however, well known and customary in the art and thus not discussed in any further detail, including those for elements other than the fabrication tools 16 mounted on the tool platform 12T and which will require material, power or control connections.

As also shown, and as described herein above and in U.S. Pat. Nos. 7,700,016 and 7,993,123, the fabrication system 10 will further include a planing device 34 for removing a portion of the most recently deposited layer of the sacrificial mold material and the model material to reduce the current layer to a selected thickness and thereby establish the plane of the upper surface of the layer and to expose the upper surfaces of the sacrificial mold material and the model material for preparation of the next subsequent layer. In one embodiment of the fabrication system 10, as illustrated in FIGS. 1A-1C, the planing device 34 is typically mounted on a planing carriage 34C which, in turn, is mounted upon and movable along the opposed X axis rails 22X. The planing device 34 may comprise, for example, a helical rotary cutter having a horizontal axis of rotation which is orthogonal to the X axis rails 22X so as to plane the uppermost current layer of the composite model 14 along a plane parallel to the tool platform plane 12XY. The fabrication system 10 will also typically include a vacuum or a blowing connection 34V for extracting and disposing of any material cut and/or removed from the area or areas of the upper most layer of the composite model 14, such as that produced by the planing device 34, and possibly removing any excess overspray material from the material deposition devices 18A, 18B . . . 18Z.

C. Method and Mechanisms for Monitoring and Control of the Tool Platform, Workpiece Platform and the Fabrication Tools As described herein above, the present invention is directed to a system including methods and mechanisms for the establishment, monitoring and control of the positions, orientations and operational tolerances of and between the elements of the apparatus for fabricating three dimensional models from successive layers of the model and the sacrificial materials, including the relative positions and orientations in three dimensions of the workpiece platform 12W, the tool platform 12T, the layer of the composite model 14 and the fabrication tools 16 and the operations of such elements of the fabrication system 10.

The functions that may be performed by the present invention may include, for example, identification of the presence and quality of all types of deposition of the sacrificial or the model materials, including determining the volume output of material deposition device(s) 18, monitoring the thicknesses of the deposition, the rates of deposition, the edge orientations and the tolerances thereof of the deposited materials, determining the position of the tool platform 12T and the individual fabrication tools 16 mounted thereon, including, for example, the positions of the deposition of the materials deposited by the material deposition devices 18 and the positions, the milling paths, the milling path widths and the milled path quality of the milling tool(s) 20. Other functions may include, for example, the determination of the vertical position of the workpiece platform 12W and thereby of the upper surfaces of the workpiece base 12B and of layers of deposited material of the composite model 14, and monitoring of the state and operation of various elements of the mechanisms of the present invention.

The elements of the fabrication monitoring system 36 of the present invention for determining the positions, the orientation and the operating state of the elements of the fabrication system 10, including the tool platform 12T, the workpiece platform 12W and the fabrication tools 16, are diagrammatically illustrated in FIGS. 1A and 2A-2E.

As illustrated in FIG. 1A, one embodiment of the fabrication monitoring system 36 may include an imaging monitoring system 38 that includes the digital camera 40C mounted onto the tool platform 12T and having an imaging axis directed and aimed vertically downward toward the upper surface of the workpiece platform 12W with the camera imaging axis being generally parallel to or at a relatively small acute angle to the Z axis 12Z. The imaging monitoring system 38 will further include a vertical illumination source 40V as well as an oblique illumination source 40O, either or both of which may be mounted on, for example, the tool platform 12T or the body of camera 40C and at a location generally adjacent to an inlet lens of the camera 40C. The vertical illumination source 40V is mounted with an axis of light emission that is parallel to or at a relatively small acute angle to the imaging axis of the camera 40C, while the oblique illumination source 40O is mounted with an axis of light emission that is at an oblique angle with respect to the imaging axis of the camera 40C. According to one embodiment of the fabrication monitoring system 36, the camera 40C is a relatively conventional digital camera operating in the visual light spectrum, with the vertical illumination source 40V and the oblique illumination source 40O correspondingly emitting light in the visual spectrum. In other embodiments, and depending, for example, based upon requirements and/or restrictions imposed by the materials or conditions of fabrication of the composite model 14, the camera 40C and the illumination sources 40V and 40O may operate in other regions of the emission spectrum, such as the infrared or the ultraviolet. In addition, the illumination sources 40V and 40O may comprise, for example, incandescent type bulbs, light emitting diodes, fluorescent panels, or any other suitable form of device capable of emitting the desired pattern of illumination in the desired spectral range.

Figure 2A:
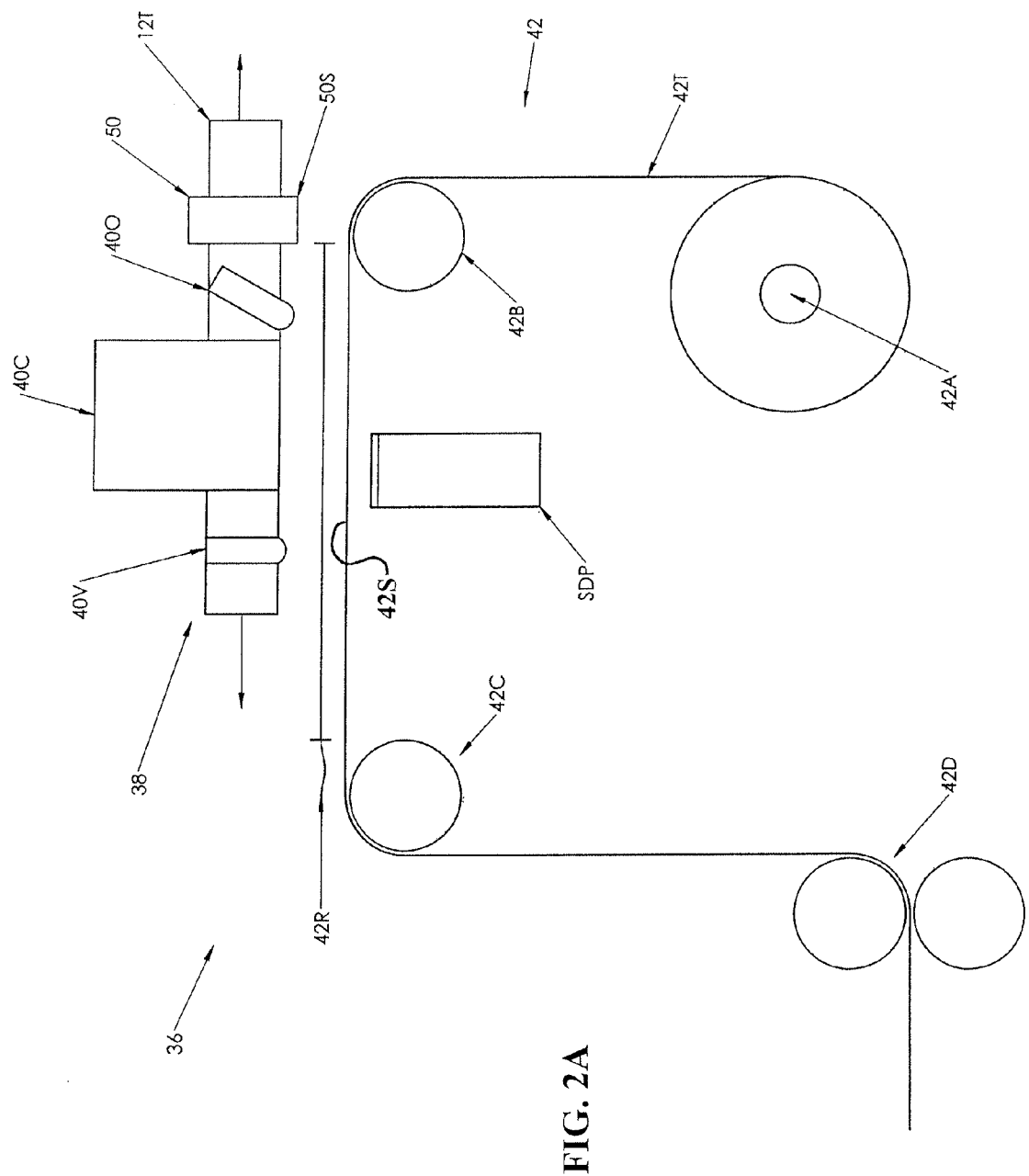
FIG. 2A is a sectional view of an imaging test surface mechanism.
Figure 2B:
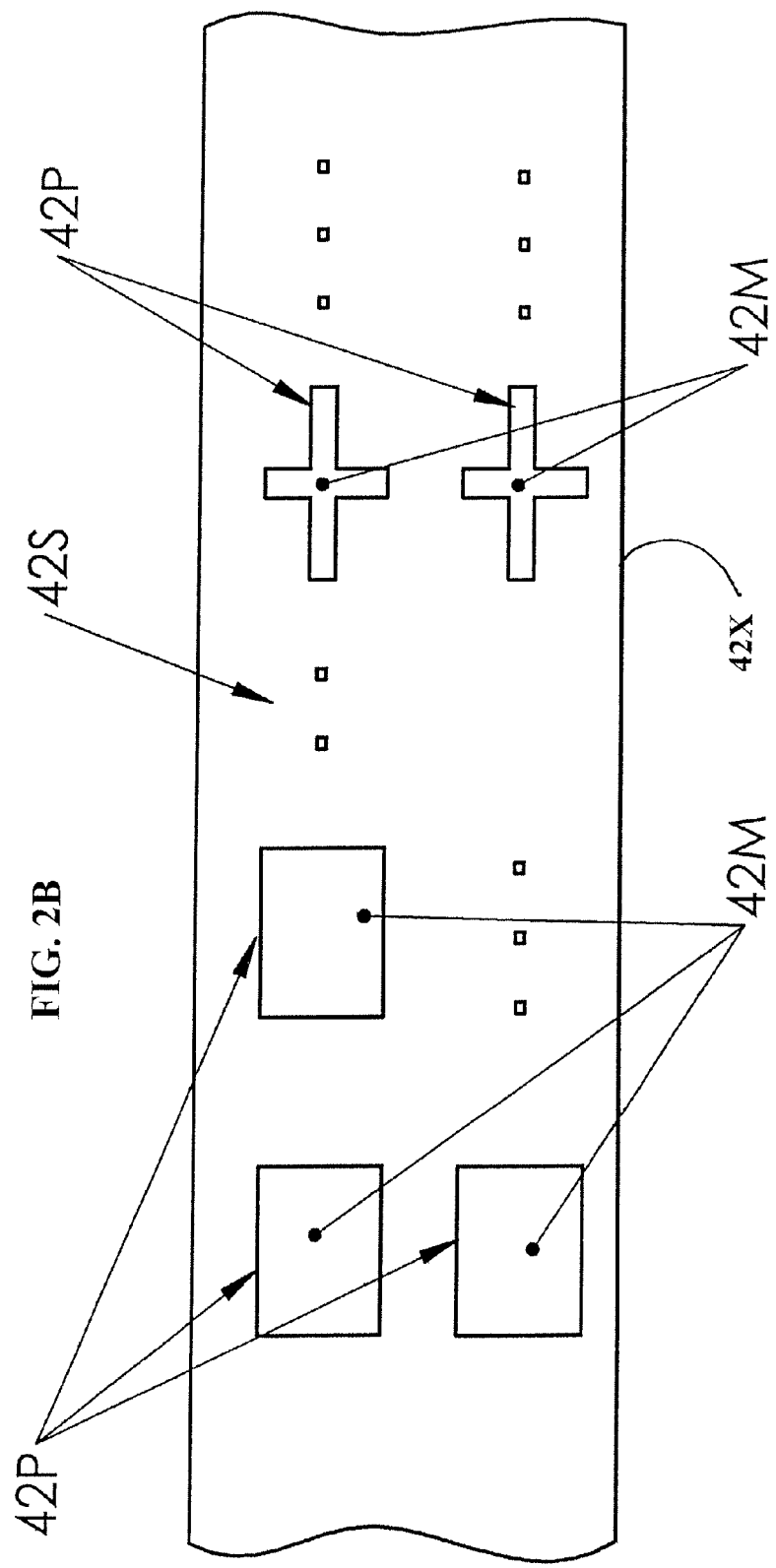
FIG. 2B is a plan view of a test surface with exemplary test patterns.
Figure 2C:
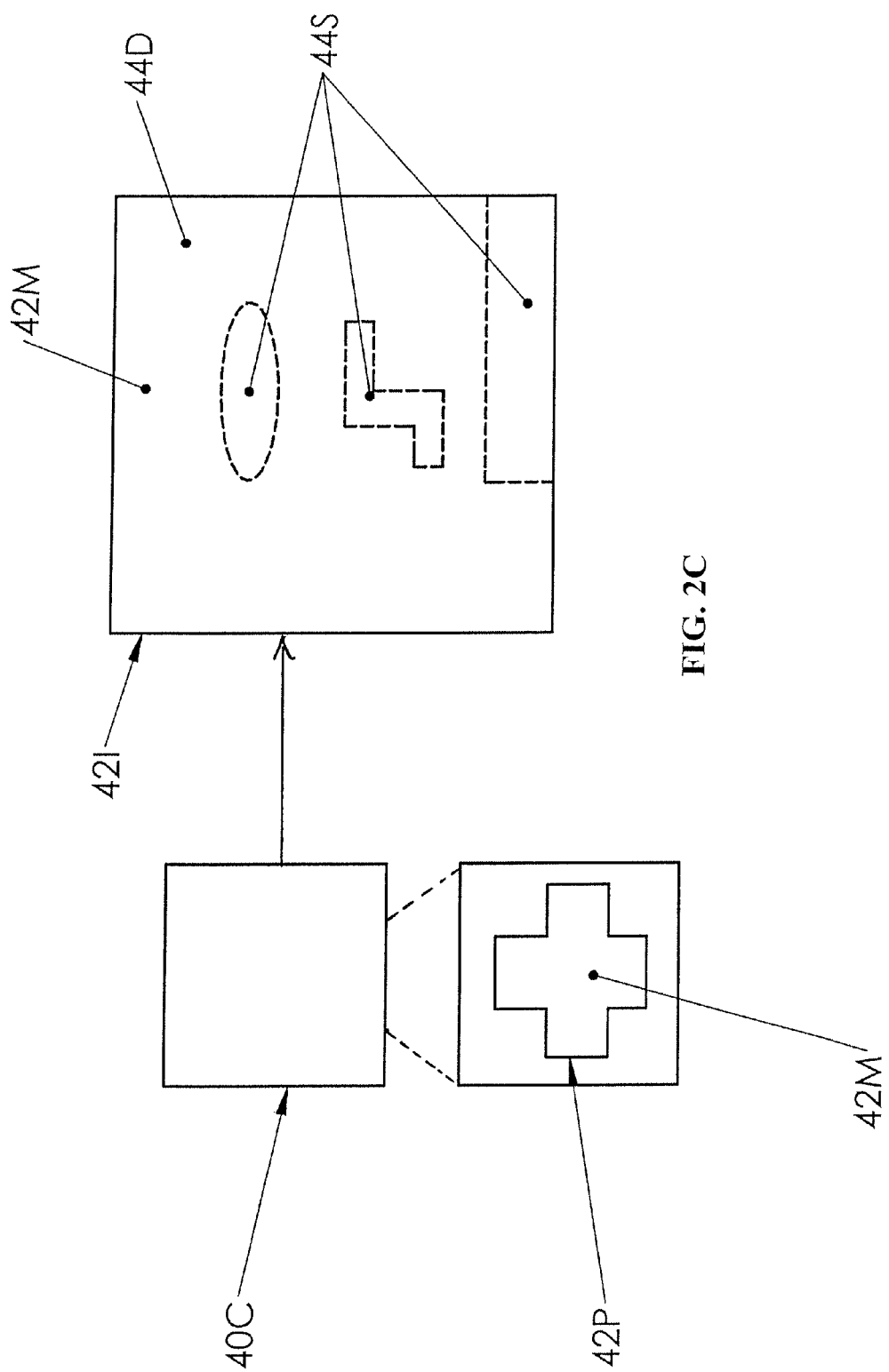

For certain embodiments, the imaging monitoring system 38 may further include an imaging test surface mechanism 42, as illustrated in FIGS. 1A and 2A, in which FIG. 2A is a diagrammatic cross sectional view, along the Y/Z plane, from the right side of FIG. 1A of the imaging test surface mechanism 42 of the present invention. The imaging test surface mechanism 42 includes a test surface 42S that is horizontally disposed in a test region 42R. The test region 42R and the test surface 42S are both positioned below the tool platform reference plane 12XY and generally parallel with the tool plane XY, and thereby generally parallel with and at, or close to, a vertical height or level of the current uppermost layer of the composite model 14 being fabricated. In a typical embodiment of the imaging monitoring system 38, the test surface 42S comprises an elongate strip of a disposable material, such as paper, a plastic or a similar material. In a present embodiment, as illustrated in FIGS. 2A-2C for example, the test surface 42S comprises a strip of paper test tape 42T wound around and stored on a storage spool 42A with the test tape 42T passing over a pair of test strip support rollers 42B and 42C located at opposing ends of test region 42R and through take-up drive mechanism 42D, which may comprise a pair of driven rollers, to facilitate stepped dispensing and viewing of the test strip by an operator. In the present embodiment, the test tape 42T is supported horizontally in the test region 42R, between support rollers 42B and 42C and at the desired level relative to the tool plane 12T, due to tension maintained on the test tape 42T by the take-up drive mechanism 42D and the rotational resistance provided by the storage spool 42A.

In certain embodiments of the imaging test surface mechanism 42, the imaging test surface mechanism 42 or at least the test surface 42S and the test region 42R portions of the mechanism with, for example, the support rollers 42B and 42C for the test tape 42T, are mounted, for example, to the structure of the fabrication system 10, to be at a fixed displacement below the tool platform reference plane 12XY and the vertical position of the test surface 42S and the test region 42R are thereby independent of the vertical position of the workpiece platform 12W and the upper surface of the workpiece base 12B. This arrangement thereby allows the monitoring of the X horizontal axis 12X and Y horizontal axis 12Y positioning of the tool platform 12T and the fabrication tools 16 mounted thereon, and the accuracy and operating characteristics of, for example, the material deposition devices 18 and the milling tools 20. In other embodiments, at least the test surface 42S and test region 42R portions of the mechanism with, for example, the support rollers 42B and 42C for the test tape 42T, are mounted directly or indirectly to the workpiece platform 12W so that test surface 42S is vertically positional with the workpiece platform 12W and, for example, the upper surface of the workpiece base 12B. In these embodiments, therefore, the imaging test surface mechanism 42 may be used to monitor and/or control the Z vertical axis motion and position of the workpiece platform 12W and the upper surface of workpiece base 12B, as described herein below, and thus the vertical positions of the layers of the composite model 14, by creating and image analyzing test patterns created directly onto the workpiece platform 12W, the upper surface of the workpiece base 12B or the successive layers of the composite model 14 during fabrication of the composite model 14.

It must be understood that, for purposes of the present invention as described herein, any of the upper surface or surfaces of the workpiece platform 12W, including the upper surface of the workpiece support plate 12S and the upper surface of the workpiece base 12B, the test surface 42S or the currently uppermost layer of the composite model 14, may comprise an imaging surface 42X for receiving the test pattern 42P to be subsequently examined by the imaging monitoring mechanism 38 to determine at least one characteristic of the test pattern 42P on the imaging surface 42X. As described, such characteristics may include, for example, the presence, the quality, the location, the geometric characteristics and the degree of coverage of the imaging surface 42X by the test pattern 42P, the vertical offset between formed thereon, including the vertical distance between the imaging surface 42X and the tool platform reference plane 12XY, and the parallelism between imaging surface 42X and the tool platform reference plane 12XY.

D. Methods for Monitoring the Accuracy of Position and Degree of Coverage in the Deposition of Sacrificial and Model Materials According to the present invention, the imaging monitoring system 38 with the imaging test surface mechanism 42 provides a means or mechanism for identifying the presence and the quality of the deposition of all types of deposited materials, including the positions, the patterns and the thicknesses of the material depositions, including the locations, the orientations, the quality and the tolerances of the bodies and the edges of the regions of the deposited materials. It will be appreciated that monitoring of these characteristics of the depositions of, for example, the sacrificial and the model materials, will also provide monitoring and testing of the positioning and the positioning tolerances of the material deposition devices 18 as well as of the deposition patterns of both drop-on-demand (e.g., drop-by-drop) as well as rapid deposition (spray) devices 18.

Figure 2E:
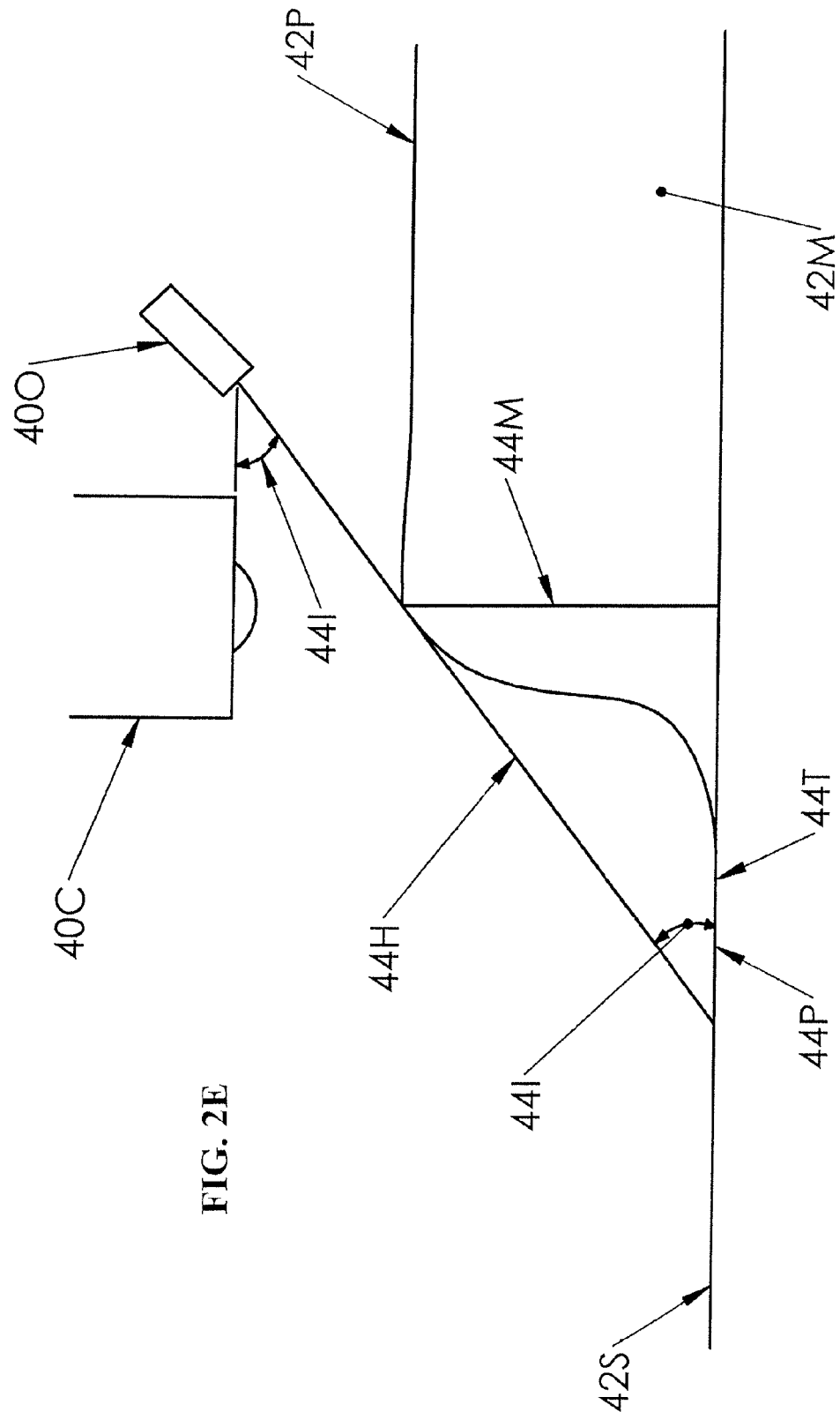

These functions and operations of the present invention are illustrated in FIGS. 1A, 2A, 2B, 2C, 2D and 2E wherein FIG. 2B is a top plan view of a few sections of the test surface 42S with examples of possible test patterns 42P of the sacrificial or the model material deposited thereon by one or more material deposition devices 18. FIGS. 2C, 2D and 2E are vertical diagrammatic sectional views of the examination of the test pattern 42P by the camera 40C and the vertical and the oblique illumination sources 40V and 40O of the imaging monitoring system 38.

As illustrated therein, and according to the present invention, the fabrication monitoring system 36, acting via the system controller 26 which is operating under control of the imaging monitoring system 38, directs one or more of the deposition device 18 to deposit one or more test patterns 42P onto the test surface 42S in the test region 42R, that is, onto the portion of the test tape 42T currently positioned in the test region 42R.

As illustrated in FIG. 2B, the test patterns 42P may include rectangular shapes as well as small, more linear shapes or lines and the test patterns 42P may be chosen for specific purposes of monitoring one or more functions of the fabrication system 10. For example, larger square or rectangular test patterns 42P may be preferable for detecting and monitoring the evenness of coverage of a given area by a specific deposited material 42M (e.g., the sacrificial material or the model material), to be deposited by a corresponding material deposition device 18, with the imaging monitoring system 38 detecting the location(s) and size(s) of the region(s) within the test pattern 42P, wherein the test surface 42S is visible through the deposited material 42M, as well as the degree to which the test surface 42S is detectable. Either larger rectangular shapes or smaller, more linear shapes or lines may by used, for example, for detecting and monitoring the locations, the evenness, the sharpness and/or the irregularity and the linearity of the edges of areas in which the deposited material 42M is deposited and the accuracy and tolerances with which the deposited material 42M may be determine by the image contrast between the image areas showing the test surface 42S and the deposited material 42M. In these cases, the imaging monitoring system 38 may, for example, identify and measure the precision with which the deposited material 42M are deposited or from which the deposited material 42M is removed by, for example, the milling tool(s) 20, by detecting the locations of the test pattern 42P edges and corners. In this regard, it will be noted because the fabrication monitoring system 36 acts through and via the system controller 26, which is operating under control of the imaging monitoring system 38 to control the test deposition and/or the removal of deposited material 42M and the acquisition of images by the camera 40C, the relative locations of the tool platform 12T and thus of the material deposition devices 18, the milling tools 20, the camera 40C and the images obtained by the camera 40C, at the time of material deposition or removal and image capture may be readily determined. This information, in turn, allows the imaging monitoring system 38 to determine the accuracy at which the patterns of the material being deposited by the material deposition devices 18 or the material being removed by one or more of the milling tools 20 and thereby the accuracy and the performance of all components and elements of the fabrication system 10. In addition, the imaging monitoring system 38 may determine the evenness, the sharpness and the linearity, or lack thereof, by analysis of the edge and/or the corner regions of the test pattern(s) 42P and identifying, for example, number and pattern of the image elements along the edges and the corner regions of the test patterns 42P representing the deposited material 42M and the test surface 42S.

It should be noted in this regard that the various forms of the sacrificial and the model material may be of different colors, thereby aiding in distinguishing among the various patterns deposited on the test surface 42S and aiding in detecting, for example, the source of excessive overspray. It should also be noted that the color and optical characteristics of the surface of the test surface 42S may generally be selected for imaging contrast with the sacrificial and the model materials, thereby aiding in detecting, for example, the edge of the test pattern 42P or the thickness of the test pattern 42P by detecting when, or to what degree, the test surface 42S is visible through a deposit of the sacrificial or the model material.

Vertical and Oblique Imaging

Referring to FIGS. 2C-2E, FIGS. 2C-2E are diagrammatic sectional views of the examination of a test pattern 42P by the camera 40C and the vertical and oblique illumination sources 40V and 40O of the imaging monitoring system 38. FIGS. 2C and 2D illustrate, for example, the use of the camera 40C and the vertical illumination source 40V to determine, for example, the location of an edge or corner of the test pattern 42P and/or the evenness, the sharpness and the linearity of an edge or corner of the test pattern 42P, or the coverage provided by a deposit of the sacrificial or the modeling material. FIG. 2E, in turn, illustrates the use of the camera 40C and the oblique illumination source 40O to determine, for example, the thickness of a deposit of either the sacrificial or the modeling material.

As diagrammatically illustrated in FIG. 2C, the imaging monitoring system 38 may illuminate a test pattern 42P with vertical illumination source 40V and, by use of the camera 40C, capture a test image 42I of a region located within the test pattern 42P, as when imaging a larger, rectangular test pattern 42P to determine the quality of the coverage of the material deposit 42M. As illustrated therein, the test image 42I, captured within the test pattern 42P, comprises at least one image region 44D representing corresponding areas of the test pattern 42P occupied by the sacrificial or the model material, and may include at least one image region 44S occupied, in whole or in part, by the test surface 42S or wherein some aspect of the test surface 42S appearing in the image element 44S, such as a color tint or grayscale value of the test surface 42S showing through the sacrificial or the model material of the test pattern 42P. The imaging monitoring system 38 may then determine, from this information, whether the sacrificial or the model material is adequately covering the region of the test pattern 42P and the quality or the degree of coverage or of adequate coverage by, for example, determining the ratio of the image region or regions 44D to the image region or regions 44S within at least a selected region of the test image 42I.

FIG. 2D diagrammatically illustrates the use of the camera 40C and the vertical illumination source 40V to capture another test image 42I of a region of the test pattern 42P including an edge or a corner area of the test pattern 42P to determine the location of an edge or corner of the test pattern 42P and/or the evenness, the sharpness and the linearity of the edge or corner of the test pattern 42P. As in the process illustrated in FIG. 2C, the imaging monitoring system 38 may, in this instance, identify a boundary between the region or regions 44D of the test image 42I representing the sacrificial or model material and the region or regions 44S representing test surface 42S. The imaging monitoring system 38 may then determine the location of the pattern from the location of the boundary between regions in the test image 42I, and thus the accuracy with which the test pattern 42P was deposited on the test surface 42S. By suitable analysis of the test image 42I, e.g., by methods well known in the relevant art, the imaging monitoring system 38 may determine the straightness or curvature of the boundary between regions 44D and 44S and, by determining the sharpness or the lack of sharpness of the boundary, may determine the precision by which the tool platform 12T and the material deposition device 18 or the milling tools 20 are constructing or fabricating the edges or side surfaces of the test pattern 42P.

It will be recognized with respect to the above described processes that the specific methods by which the test image 42I is analyzed will depend, for example, upon the resolution of the images 42I captured by the camera 40C, the distance between the camera 40C and the test surface 42S and the desired accuracy with which the coverage, the position and the boundary definition of the test pattern 42P are to be determined. For example, the images 42I may resolve to the level of relatively small image areas, such as the pixel or pixel group level, at which point the processes for identifying the regions or the extents of the regions occupied by the deposited materials 42M, as opposed to the test surface 42S, may be determined on a this image element level, that is, and for example, on a pixel by pixel basis. The determination of the degree of coverage of a given area by deposited material 42M may, at this level of resolution, by accomplished by determining, for example, whether individual pixels show the color or gray scale image value of the deposited material 42M or the test surface 42S. It will be appreciated that while determination at this level of resolution results in a higher degree of accuracy, and may be required in some applications, the determination at this level of resolution is more time consuming and processing intensive that for lower resolutions.

The test image analysis, at lower resolutions, will typically involve determining whether correspondingly larger areas of the test image 42I are occupied by the deposited material(s) 42M or by the test surface 42S. In region(s) along boundary or when determining the degree or the quality of coverage of the test surface 42S, by the deposited material(s) 42M in a larger region, the determination of whether a given area is, or is not, or to what extent it is occupied by the deposited material(s) 42M or the test surface 42S may be determined by the relative color or gray scale value of the area in question, either on an absolute scale or by comparison to adjoining areas.

Referring now to FIG. 2E, therein is illustrated the use of the camera 40C and the oblique illumination source 40O to determine the thickness of coverage of a given test surface area by the deposited material 42M. As shown therein, the illumination of the boundary area of a region of the deposited material 42M, on the test surface, results in the casting of a shadow 44P onto the adjacent region of the test surface 42S, with the shadow 44P having a triangular cross section with a test surface side 44T extending along the test surface 42S, a deposited material side 44M extending generally along an vertical edge of the region of the deposited material 42M and a third hypotenuse side 44H being the hypotenuse of the triangle. The included angle, defined by the intersection 44I between the test surface side 44 and the hypotenuse side 44H, is determined by the position and the axis of emission of the oblique illumination source 40O relative to a vertically upper most edge of the deposited material 42M of the test pattern 42P and the plane of the test surface 42S.

The imaging monitoring system 38 may determine the width of the shadow 44P on the test surface 42S from a test image 42I by simple geometry from a known distance between the camera 40C and the test surface 42S and the width of the image of the shadow 44P in the test image 42I. The included angle of the intersection 44I, between the test surface side 44 and the hypotenuse side 44H, is also known, thereby allowing the imaging monitoring system 38 to determine the length of the third side of the triangle, that is, the length of the deposited material side 44M by simple geometry.

Figure 3A:
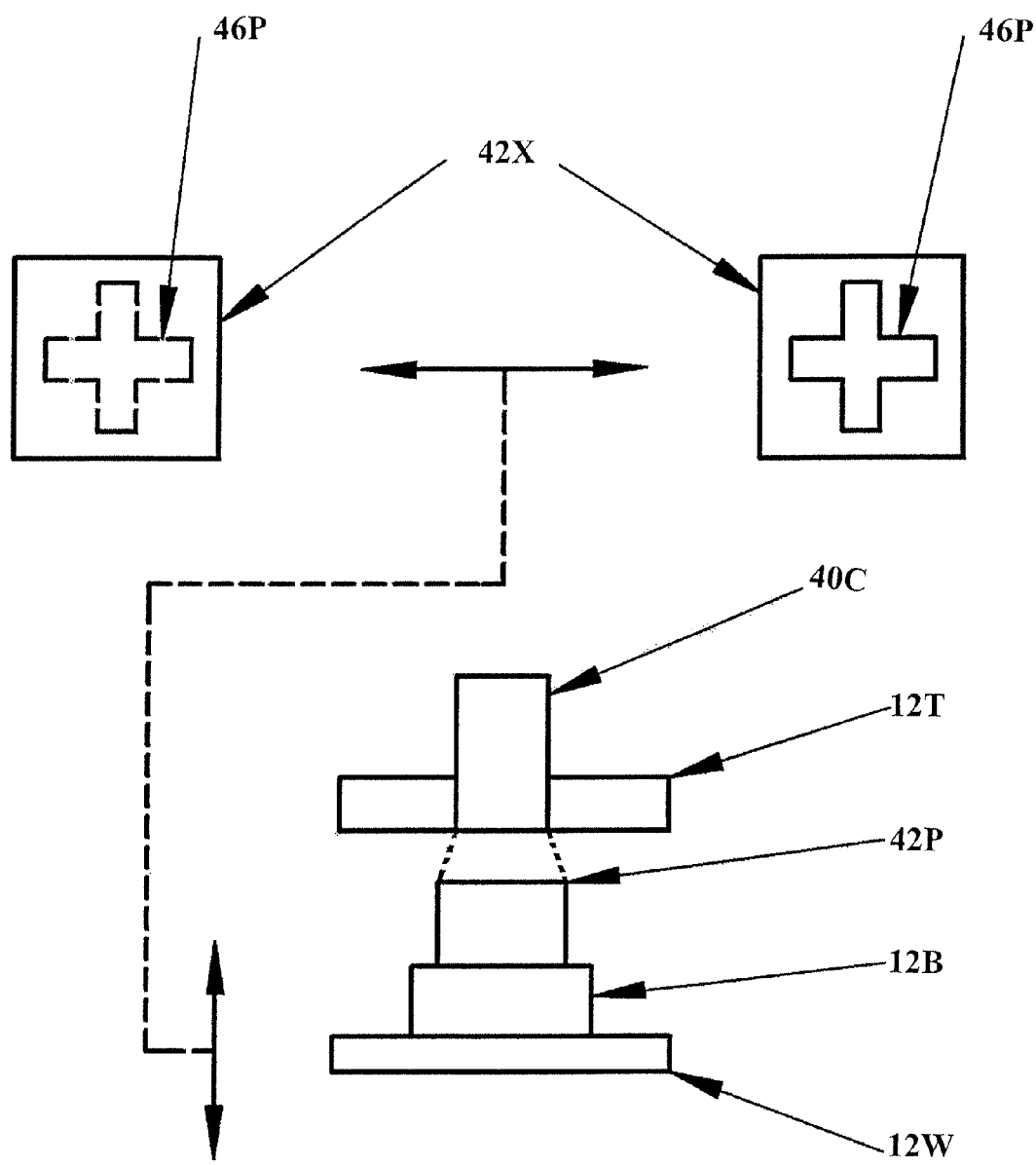
FIG. 3A is a diagrammatic representation of an image focus method for determining the vertical position of the upper surface of workpiece base.
Figure 3C:
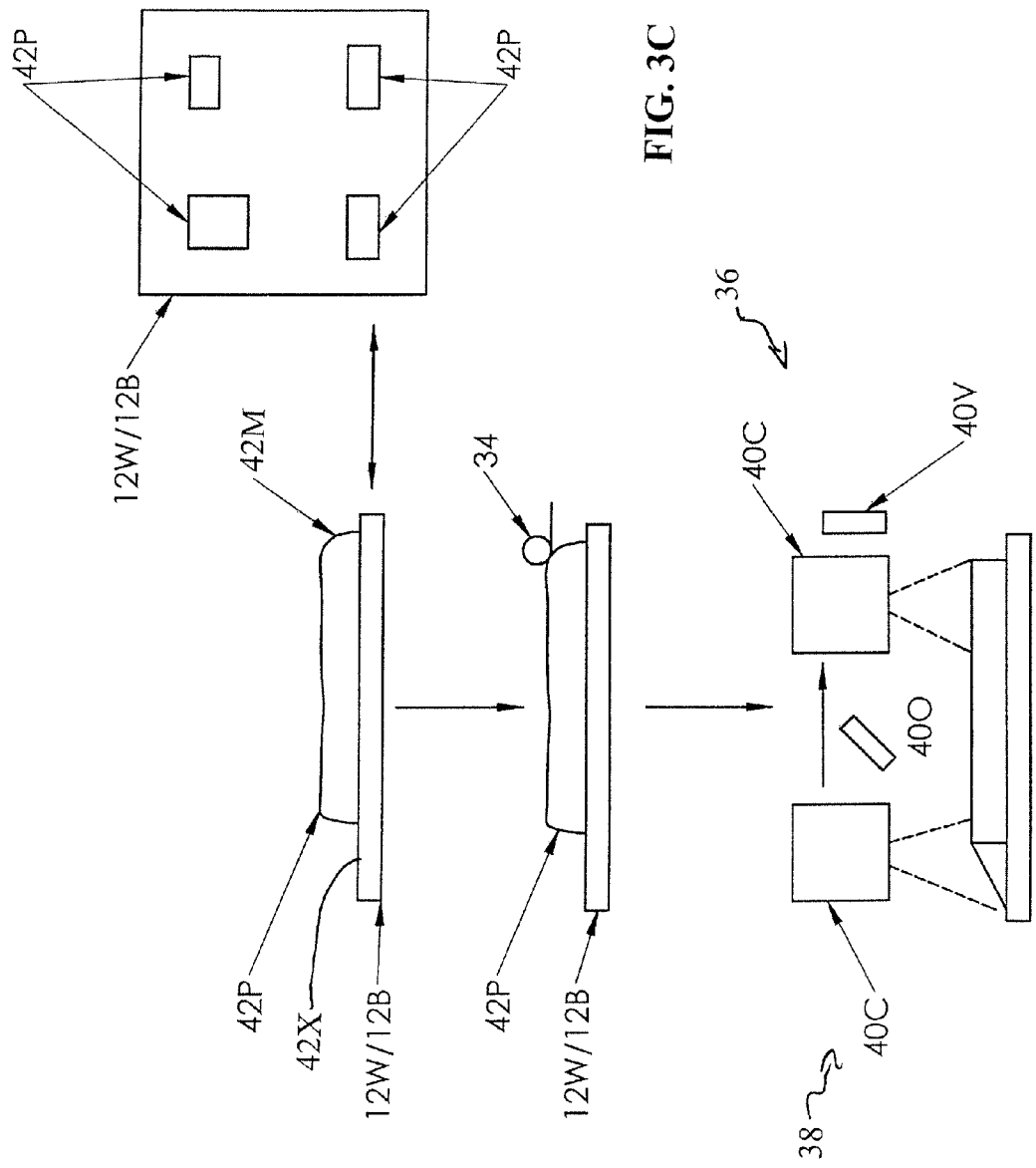
FIG. 3C is a diagrammatic representation of a milled test pattern method for determining the vertical distance between the upper surface of workpiece base or workpiece platform and tool plane.

E. Methods for Determining the Vertical Positioning and Parallelism of Workpiece Platform and Layers of a Composite Model with the Tool Plane As described herein above, the functions and purposes of the fabrication monitoring system 36 further include monitoring the relative positions and the orientations, in three dimensions, of the workpiece platform 12W, the tool platform 12T, the layer of the composite model 14 and the fabrication tools 16. FIGS. 3A-3C and the following description will describe the operations of the fabrication monitoring system 36 for determining the vertical position of the workpiece platform 12W relative to the tool platform 12T and the parallelism of the workpiece platform 12W and of the layers of the composite model 14 with the tool platform reference plane 12XY. In this regard, it must be noted that because this embodiment of the fabrication system 10 fabricates the composite model 14 on the upper surface of the workpiece base 12B which, in a present embodiment, is mounted directly onto the workpiece platform 12W or onto the workpiece support plate 12S which is mounted onto the workpiece platform 12W, the following description will describe these operations in terms of determining the vertical positioning and parallelism of the upper surface of the workpiece base 12B.

As will be described herein below, the upper surface or surfaces of the workpiece platform 12W include the upper surface of the workpiece support plate 12S and the upper surface of workpiece base 12B. It will be understood, however, that the same operations and methods may be employed in embodiments wherein the fabrication system 10 does not include the workpiece base 12B but instead mounts the composite model 14 directly onto the workpiece platform 12W or onto the workpiece support plate 12S which is, in turn, mounted onto the workpiece platform 12W. In this embodiment, the upper surface or the side of the workpiece platform 12W or the workpiece support plate 12S is used in the method rather than the upper surface of the edge of the workpiece base 12B.

Image Focus Method

Referring first to FIG. 3A, therein is illustrated an image focus method for determining the vertical position of the workpiece platform 12W relative to the tool platform 12T and the parallelism of the workpiece platform 12W and of the layers of the composite model 14 with the tool platform reference plane 12XY. As will be described herein below, the upper surface or surfaces of the workpiece platform 12W, including the upper surface of the workpiece support plate 12S and the upper surface of the workpiece base 12B relative to the tool platform reference plane 12XY. According to the image focus method, at least one focus pattern 46P is formed on imaging surface 42X, either previously, such as at the fabrication of the workpiece base 12B, or before or during the fabrication of the composite model or models 14 by the material deposition device 18 on the tool platform 12T. The vertical position of the imaging surface 42X and thereby of the workpiece platform 12W is then adjusted to a predetermined distance below the tool platform reference plane 12XY by fixing the focal length of the camera 40C to correspond with the desired predetermined distance between the tool platform reference plane 12XY and the focus pattern 46P, and thus imaging surface 42X. The vertical position of the workpiece platform 12W is then adjusted while comparing the contrast between neighboring pixels of a focus image 46I, acquired by the camera 40C, until the focus pattern 46P and thus imaging surface 42X is at the focal length distance below the camera 40C, as indicated by the maximum obtainable contrast between neighboring pixels of the image.

It will be recognized that the image focus method is a reversal of a method often used for focusing images in autofocusing cameras, where the object is at a fixed distance from the camera and the focal length of the camera is automatically adjusted to obtain the maximum contrast between adjacent pixels of the image. It will also be recognized that other commonly known methods for determining the focus of the camera may be employed in place of the fixed focal length method discussed above and utilized by the fabrication monitoring system, such as adjusting the focal length of the camera 40C to obtain the maximum contrast between pixels and measuring the focal length to obtained to determine the distance between the camera 40C and the focus pattern 46P. This method would, however, require successive adjustments of the workpiece platform 12W and measurements of the focal distance in orderto adjust the vertical distance between the imaging surface 42X and tool platform reference plane 12XY to the desired value.

It must also be noted that the image focus method, for determining the vertical displacement between the imaging surface 42X or the workpiece platform 12W and the tool platform reference plane 12XY, may also be employed to determine the degree of parallelism between the imaging surface 42X and the tool platform reference plane 12XY. That is, and more specifically, a focus pattern 46P may be created at multiple points along the imaging surface 42X, such as at three or four corner locations on the upper surface of the workpiece base 12B or the workpiece platform 12W. Once the imaging surface 42X, at one of the corner focus patterns 46P, has been adjusted to the desired distance from the camera 40C, that is, from the tool platform reference plane 12XY, the distance between the camera 40C and the two or the three other corner focus patterns 46P may be determined in the same manner to ascertain whether or not each of the corner focus patterns 46P is at the same desired offset from the tool platform reference plane 12XY. The checking of each of the two or three subsequent corner focus pattern 46P, after adjustment of the first corner focus pattern 46P, may be on a yes/no basis, or the position of the imaging surface 42X may be adjusted for each of the subsequent corner focus patterns 46P to provide a measurement of the error in parallelism between the imaging surface 42X and the tool platform reference plane 12XY.

Parallax Method

Referring now to FIG. 3B, therein is illustrated a parallax method for determining the vertical offset between imaging surface 42X and the tool platform reference plane 12XY, and/or the degree of parallelism between the imaging surface 42X and the tool platform reference plane 12XY. According to the parallax method, the imaging surface 42X comprises a vertical parallax reference plane 48R perpendicular to the workpiece base 12B or the workpiece platform 12W and fixed to the workpiece base 12B or the workpiece platform 12W or formed as part of or mounted onto the workpiece base 12B or the workpiece platform 12W. As illustrated in FIG. 3B, the parallax reference plane 48R includes a parallax reference pattern 48P of known vertical dimension and a vertical edge of the workpiece base 12B or the workpiece platform 12W is selected as the parallax reference plane 48R, with the parallax reference pattern 48P extending over a part of or the entirety of the vertical width of the vertical edge of the parallax reference plane 48R, depending upon the dimensions of parallax reference plane 48R.

As illustrated in FIG. 3B, the tool platform 12T with the camera 40C is position along and offset horizontally perpendicular to the parallax reference plane 48R so that image capture angle of the camera 40C includes the parallax reference pattern 48P. The vertical dimension of the parallax reference pattern 48P is selected so that the image of the parallax reference pattern 48P occupies a width, or a portion, of the test image 42I captured by the camera 40C that is determined by, for example, the angle between the image axis of the camera 40C and the parallax reference plane 48R, the distance between the camera 40C and the parallax reference pattern 48P and the accuracy to which the distance between the tool platform reference plane 12XY and the parallax reference pattern 48P, and thus between the tool platform reference plane 12XY and the surface of the workpiece base 12B or the workpiece platform 12W to be determined.

The imaging monitoring system 38 then captures the test image 42I of the parallax reference pattern 48P at a first position along parallax reference plane 48R, typically toward a first end of the parallax reference plane 48R and, from the apparent width of the parallax reference pattern 48P in the test image 42I and the known distance and angle between the image axis of the camera 40C and the parallax reference pattern 48P, determines the distance between the camera 40C, and thereby the tool platform reference plane 12XY, and the parallax reference pattern 48P, and thereby the surface of the workpiece base 12B or the workpiece platform 12W, at the first position. The tool platform 12T, with the camera 40C, then traverses along parallax reference plane 48R to a second location, which is spaced from the first position the camera 40C is moved to the right in FIG. 3B, and the camera 40C then captures a second test image 42I of the parallax test pattern 48P, and determines the distance between the camera 40C, and thereby the tool platform reference plane 12XY, and the parallax reference pattern 48P, and thereby the surface of the workpiece base 12B or the workpiece platform 12W, at the second position. The imaging monitoring system 38 then compares the camera 40C to the parallax reference pattern 48P distances, at both the first and second locations, to determine the degree to which the surface of the workpiece base 12B or the workpiece platform 12W is parallel to the tool platform reference plane 12XY along the axis corresponding to the axis of parallax reference plane 48R.

The imaging monitoring system 38 may then repeat these measurements along the parallax reference plane 48R and the parallax reference pattern 48P along a second parallax reference plane 48R oriented orthogonally to the first parallax reference plane 48R, such as along a second edge of the workpiece base 12B or the workpiece platform 12W perpendicular to the first edge of workpiece base 12B or the workpiece platform 12W, to determine the degree at which the surface of the workpiece base 12B or the workpiece platform 12W is parallel to the tool plane 12T along the second axis.

Milled Test Pattern Method

Referring to FIG. 3C, therein is illustrated a milled test pattern method for determining the vertical distance between the imaging surface 42X and the tool platform 12T and the degree to which imaging surface 42X is parallel with tool platform reference plane 12XY.

According to the milled test pattern method, the imaging monitoring system 38 directs the tool platform 12T and the material deposition devices 18 thereon to deposit one or more test patterns 42P at least one location on the imaging surface 42X. As will be described below, each test pattern 42P on the imaging surface 42X allows the imaging monitoring system 36 to determine the vertical distance between the tool plane 12T and the imaging surface 42X at the location of the test pattern 42P. A plurality of test patterns 42P at selected locations along the imaging surface 42X will thereby be imaged, by the imaging monitoring system 38, to determine the degree of parallelism between the tool platform 12T and the imaging surface 42X.

According to the milled test pattern method, therefore, the imaging monitoring system 38 directs the tool platform 12T and one or more of the material deposition devices 18 thereon to form one or more test patterns 42P at one or more locations on the imaging surface 42X. The imaging monitoring system 38 then employs the camera 40C to confirm the presence of the test pattern or patterns 42P at the intended locations on the imaging surface 42X, and directs the fabrication system 10 to increment the vertical position of the workpiece platform 12W upward toward the tool platform reference plane 12XY so that the imaging surface 42X, upon which the test pattern or patterns 42P were deposited, is at a known distance below the cutting plane of the planing device 34. As described herein above with regard to the fabrication of the layers of the composite model 14, the upper surface of the deposited test pattern or patterns 42P should at least partially extend, in at least some regions, above the cutting plane of the planing device 34 while the upper surface of the imaging surface 42X, and thus the lowest region of the test pattern or patterns 42P remain below the cutting plane of the planing device 34, so that the test pattern or patterns 42P should be planable to a specified thickness greater than zero, if the upper surface of the imaging surface 42X is parallel to and at the desired distance below the cutting plane of the planing device 34. The imaging monitoring system 38 then directs the planing device 34 to plane the deposited test pattern or patterns 42P to the specified thickness in the same manner as described herein above with regard to the fabrication of the layers of the composite model 14.

The imaging monitoring system 38 then employs the camera 40C to examine each test pattern 42P, as described herein above, to determine the integrity of the deposited material 42M over each test pattern 42P or the degree to which each test pattern 42P is degraded such that, for example, a portion of the deposited material is missing from certain sections of one or more test patterns 42P or the upper surface of the imaging surface 42X is visible through the covered regions of each test pattern 42P. The results of this examination will, in turn, indicate whether the upper surface of the imaging surface 42X is at the specified vertical distance below the cutting plane of the planing device 34 and thereby at the specified distance from the tool platform reference plane 12XY. When multiple test patterns 42P, at different locations on the upper surface of the imaging surface 42X are utilized, the test will provide an indication of the degree of parallelism between the tool platform reference plane 12XY and the imaging surface 42X.

It should also be noted that the imaging monitoring system 38 may further employ the oblique imaging method, described herein above, to determine the remaining thickness of the material 42M in each test pattern 42P after planing by the planing device 34, including for each of several test patterns 42P located at various points around the imaging surface 42X, to determine the vertical location and parallelism of the imaging surface 42X with respect to tool platform reference plane 12XY.

F. Additional Functions of an Imaging Monitoring System 38

The imaging monitoring system 38 may be employed for further functions pertaining to the fabrication of the composite models 14 and the operation of the fabrication system 10. For example, the camera 40C and the vertical and oblique illumination sources 40V and 40O may be employed to examine and monitor the deposition and forming of the successive layers of the composite model 14 and elements and regions thereof, including the milling away of deposited materials 42M by the milling tools 20, in the same manner as described herein above for the examination and analysis of the test patterns 42P.

In addition, for example, and as illustrated in FIG. 2A, the camera 40C may be refocused to the distance between the camera 40C and the storage spool 42A on which the test tape 42T is stored and employed to check on the availability of a sufficient amount of test tape 40T on storage spool 42A by imaging a view of storage spool 42A to detect the extent or thickness of a roll of test tape 40T stored thereon. The camera 40C may likewise be employed to detect whether the test tape 40T is correctly advancing through the take-up mechanism 42D.

In a still further embodiment of the fabrication system 10 and the imaging monitoring system 38, and as indicated in FIG. 2A, the tool platform 12T and the imaging test surface mechanism 42 may further include a capacitance monitoring mechanism 50 comprising, for example, a capacitance sensor 50S mounted on the tool platform 12T and a measurement actuation piston 50P mounted on the imaging test surface mechanism 42, below the test surface 42. The capacitance monitoring system 50 may then detect and measure the thickness and/or the degree of coverage of the deposited material 42M, in the test pattern 42P formed on the test surface 42S, by activating measurement actuation piston 50P to force the portion of the test surface 42S, which typically comprises the test tape 42T, vertically upward and so that the upper surface of the test pattern 42P and the test surface 42S come into contact with the capacitance sensor 50S. The capacitance sensor 50S may then measure the capacitance resulting between capacitance sensor 50S and the measurement actuation piston 50P, due to the presence of the test surface 42S and the deposited material 42M of the test pattern 42S between the capacitance sensor 50S and the measurement actuation piston 50P. The resulting capacitance measurement will then indicate the thickness, the area of coverage and the degree of coverage of the deposited material 42M forming the test pattern 42P.

In a still further embodiment of a fabrication system 10 and the operation thereof, the imaging monitoring system 38 may be employed, as described above, to facilitate the construction of the composite model 14 or portions thereof having "non-horizontal" layers. That is, the fabrication of the composite model 14, beginning with a foundation layer and including all subsequent fabrication layers, assumes that all of the layers are fabricated on and parallel to the workpiece plate 12W or the workpiece support 12B or some other support surface, such as a preceding layer of the composite model 14 which is, in turn, parallel to the reference base plane, such as the tool platform reference plane 12XY, which will typically be horizontal. For the convenience and the purpose of the following description, the layers of the composite model 14 fabricated in this manner and the corresponding reference base plane will be referred to as "horizontal" layers and a "horizontal" reference base plane.

In certain circumstances, however, the fabrication of the composite model 14, by horizontal layers formed on a horizontal base plane, may be disadvantageous to at least some degree and for at least some layers of the composite model 14. For example, the design of a given composite model 14 may require the deposition of large amounts of the model material or the sacrificial material by selective processes, which are more time consuming than by non-selective processes, or the removal of large amounts of the model material or the sacrificial material, which is again time consuming, either of which may result in an increase in fabrication time and associated costs. In other instances, the composite model 14 may contain one or more surfaces which are at an angle to at least the horizontal base plane and possibly to other surfaces of the composite model 14 and in certain instances, in particular, the "slanted" surfaces may comprise more area than do the "horizontal" surfaces of the composite model 14.

In such instances, and according to the present invention, the base plane upon which the composite model 14 is formed, that is, the workpiece plate 12W, the upper surface of a workpiece base 12B or, more typically, the foundation layer of model or the sacrificial material formed on the workpiece plate 12W or the workpiece base 12B, may be fabricated so as to be tilted a few degrees with respect to the horizontal reference plane, such as the tool platform reference plane 12XY. The "slanted" or "tilted" "layers of a composite model 14, formed with a tilted base plane, will thereby be effectively "horizontal" with respect to each other but tilted with respect to any "horizontal" layers of the composite model 14 and will accordingly be at an angle other than 90 degrees with respect to, for example, the vertical surfaces of the composite model 14. It must be noted that surfaces or layers running across the slant of the tilted base plane or layers will now appear as lines across successive layers of the composite model 14. In a like manner, vertical surfaces running along the tilted base plane or layers will appear on successive tilted layers as successive points or short lines. In either case, what were originally relatively large surfaces or lines of the composite model 14, when the layers were formed parallel to a horizontal base plane, will be reduced to relative short segments of lines or surfaces, thereby potentially significantly reducing the amount of selective material deposition or removal in such layers.

Since certain changes may be made in the above described method and apparatus for monitoring operation of a system for fabricating three dimensional models by successive deposition of at least at least two materials without departing from the spirit and scope of the invention herein involved, it is intended that all of the subject matter of the above description or shown in the accompanying drawings shall be interpreted merely as examples illustrating the inventive concept herein and shall not be construed as limiting, in any way, the invention.

What is claimed is:

1. A method of monitoring operation of a fabrication system for fabricating a three dimensional model by successive deposition of at least one material comprising at least one of a model material for forming the model and at least one subsequently removed sacrificial material for supporting the model material during fabrication of the model, the system including:
    a camera,
    a workpiece platform for supporting the composite model during fabrication,
    a tool platform for supporting at least one material deposition device for depositing the at least one material on layers of the model,
    the at least one material deposition device and the camera having a known orientation and planar relationship with a tool platform reference plane,
    the workpiece platform and the tool platform being movable with respect to each other along an X axis, a Y axis and a Z axis,
    and a test surface, separate from the workpiece platform, comprising a surface of a test tape stored on a test tape supply spool and configured to be advanced by a test tape take-up mechanism through a test region in which test patterns may be created on the surface of the test tape, the method comprising:
depositing at least one test pattern comprising the at least one material on at least one imaging surface related to one of a layer of the composite model, the workpiece platform, the test surface, or a currently topmost layer of the model,
capturing, via the camera, an image of the at least one test pattern,
examining, via an imaging monitoring system, the image of the at least one test pattern to determine at least one characteristic of the test pattern representing operation of the fabrication system, and
capturing, via the camera, an image of the test tape stored on the test tape supply spool to determine a remaining supply of test tape for the imaging monitoring system.

2. The method of monitoring operation of the system for fabricating the three dimensional model according to claim 1, wherein the step of examining the image of the at least one test pattern via the imaging monitoring system to determine at least one characteristic of the test pattern further comprises: determining a distribution in the image of the material on a surface of the imaging surface along at least an edge of the at least one test patterns and
determining, from the distribution of the material and the surface of the imaging surface, a characteristic of the test pattern wherein the characteristic of the test pattern includes at least one of a location of the test pattern on the imaging surface, a geometric shape of the test pattern, and a degree of coverage of the imaging surface by the material.

3. A method of monitoring operation of a fabrication system for fabricating a three dimensional model by successive deposition of at least one material comprising at least one of a model material for forming the model and at least one subsequently removed sacrificial material for supporting the model material during fabrication of the model, the system including;
a camera,
a workpiece platform for supporting the composite model during fabrication,
a tool platform for supporting at least one material deposition device for depositing the at least one material on layers of the model,
the at least one material deposition device and the camera having a known orientation and planar relationship with a tool platform reference plane, and
the workpiece platform and the tool platform being movable with respect to each other along an X axis, a Y axis and a Z axis, the method comprising:
depositing at least one test pattern comprising the at least one material on at least one imaging surface related to one of a layer of the composite model, the workpiece platform, a test surface, or a currently topmost layer of the model,
capturing, via the camera; an image of the at least one test pattern,
examining, via an imaging monitoring system the image of the at least one test pattern to determine at least one characteristic of the test pattern representing operation of the fabrication system,
illuminating the imaging surface with an illumination source having an axis of emission that is oblique to an imaging axis of the camera and to the imaging surface at a known angle of illumination,
capturing, via the camera, the image of the at least one test pattern and an adjacent area of the imaging surface including a shadow cast on the imaging surface by the material of the test pattern as illuminated by the illumination source,
determining a width of the shadow cast on the imaging surface,
and determining a thickness of the material of the test pattern from a width of the shadow cast on the imaging surface and the known angle of illumination.

4. The method of monitoring operation of the system for fabricating the three dimensional model according to claim 1,
wherein the step of examining, via an imaging monitoring system; the image of the at least one test pattern to determine at least one characteristic of the test pattern further comprises:
fixing a focal length of the camera to a fixed distance from the camera,
adjusting a distance between the test pattern on the imaging surface and the camera until an optimum focus of the test pattern is detected,
determining an offset, between the camera and the imaging surface, to be the focal length of the camera, and
determining an offset between the tool platform reference plane and the imaging surface according to a known relationship to the offset between the camera and the imaging surface.

5. The method of monitoring operation of the system for fabricating the three dimensional model according to claim 1, the imaging surface comprises a first parallax reference plane perpendicular to the workpiece platform and having thereon a first parallax reference pattern of known vertical dimension and the camera is positioned along and offset horizontally from the first parallax reference plane so that an image capture angle of the camera includes the first parallax reference pattern, and the steps of capturing, via the camera, an image of and examining, via an imaging monitoring system, the image of the at least one test pattern further comprises:
capturing, via the camera, a first image of the first parallax reference pattern at a first position along the first parallax reference plane,
from an apparent width of the first image of the first parallax reference pattern; and a known distance and angle between an image axis of the camera and the first parallax reference pattern, determining a first distance between the camera and the first parallax reference pattern and thereby a first distance between the first parallax reference pattern and the tool platform reference plane,
traversing the camera to a second position along the first parallax reference plane,
capturing, via the camera, a second image of the first parallax reference pattern at the second position along the first parallax reference plane,
from an apparent width of the second image of the first parallax reference pattern and a known distance and angle between an image axis of the camera and the first parallax reference pattern, determining a second distance between the camera and the first parallax reference pattern and thereby a second distance between the first parallax reference pattern and the tool platform reference plane, and
comparing, via the image monitoring system; the first distance, between the first parallax reference pattern and the tool platform reference plane, and the second distance, between the first parallax reference pattern and the tool platform reference plane, to determine at least one of a distance between the workpiece platform and the tool platform reference plane and a parallelism between the workpiece platform and the tool platform reference plane along at least the first parallax reference plane.

6. The method of monitoring operation of the system for fabricating the three dimensional model according to claim 5, further comprising, for a second parallax reference plane orthogonal to the first parallax reference plane:

capturing, via the camera; a first image of the second parallax reference pattern at a first position along the second parallax reference plane, from an apparent width of the first image of the second parallax reference pattern and a known distance and angle between an image axis of the camera and the second parallax reference pattern, determining a first distance between the camera and the second parallax reference pattern and thereby a first distance between the second parallax reference pattern and the tool platform reference plane, traversing the camera to a second position along the second parallax reference plane, capturing, via the camera, a second image of the second parallax reference pattern at the second position along the second parallax reference plane, from an apparent width of the second image of the second parallax reference pattern and a known distance and angle between an image axis of the camera and the second parallax reference pattern, determining a second distance between the camera and the second parallax reference pattern and thereby a second distance between the second parallax reference pattern and the tool platform reference plane, and comparing, via the image monitoring system, the first distance between the second parallax reference and the tool platform reference plane and the second distance between the second parallax reference pattern and the tool platform reference plane to determine at least one of a distance between the workpiece platform and the tool platform reference plane and a parallelism between the workpiece platform and the tool platform reference plane along at least the second parallax reference plane.

7. A method of monitoring operation of a fabrication system for fabricating a three dimensional model by successive deposition of at least one material comprising at least one of a model material for forming the model and at least one subsequently removed sacrificial material for supporting the model material during fabrication of the model, the system including:

a camera, a workpiece platform for supporting the composite model during fabrication, a tool platform for supporting at least one material deposition device for depositing the at least one material on layers of the model, the at least one material deposition device and the camera having a known orientation and planar relationship with a tool platform reference plane, the workpiece platform and the tool platform being movable with respect to each other along an X axis, a Y axis and a Z axis, and a test surface, separate from the workpiece platform, comprising a surface of a test tape stored on a test tape supply spool and configured to be advanced by a test tape take-up mechanism through a test region in which test patterns may be created on the surface of the test tape, the method comprising:

depositing at least one test pattern comprising the at least one material on at least one imaging surface related to one of a layer of the composite model, the workpiece platform, a test surface, or a currently topmost layer of the model, capturing, via the camera, an image of the at least one test pattern, examining, via an imaging monitoring system, the image of the at least one test pattern to determine at least one characteristic of the test pattern representing operation of the fabrication system, incrementing the imaging surface toward the tool platform reference plane so that a cutting edge of one of a milling tool and a planing tool at a known displacement from the tool platform reference plane intersects the at least one test pattern along a milling plane parallel with the tool platform reference plane and at a height between an upper surface of the at least one test pattern and the imaging surface, planing an area of the at least one test pattern, capturing, via the camera, an image of the planed at least one test pattern, and examining, via the imaging monitoring system, the captured image of the planed at least one test pattern to determine an offset between the image plane and the tool platform reference plane and a parallelism of the image plane with the tool platform reference plane.

8. The method of monitoring operation of the system for fabricating the three dimensional model according to claim 1, further comprising:

capturing, via the camera; an image of the test tape advanced through the test tape take-up mechanism to confirm operation of the test tape take-up mechanism.

9. The method of monitoring operation of the system for fabricating the three dimensional model according to claim 1, further comprising:

supporting the test tape horizontally in the test region by tension maintained on the test tape by the test tape supply spool and the test tape take-up mechanism.

* * * * *